(12) United States Patent
Murata et al.

(10) Patent No.: US 10,209,432 B2
(45) Date of Patent: Feb. 19, 2019

(54) LIGHTING DEVICE AND DISPLAY DEVICE

(71) Applicant: Sharp Kabushiki Kaisha, Sakai, Osaka (JP)

(72) Inventors: Mitsuhiro Murata, Sakai (JP); Ryuzo Yuki, Sakai (JP); Hisashi Watanabe, Sakai (JP); Shinya Kadowaki, Sakai (JP); Takeshi Ishida, Sakai (JP); Takeshi Masuda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/550,798

(22) PCT Filed: Feb. 5, 2016

(86) PCT No.: PCT/JP2016/053469
§ 371 (c)(1),
(2) Date: Aug. 14, 2017

(87) PCT Pub. No.: WO2016/129514
PCT Pub. Date: Aug. 18, 2016

(65) Prior Publication Data
US 2018/0045878 A1    Feb. 15, 2018

(30) Foreign Application Priority Data
Feb. 13, 2015    (JP) .................................. 2015-026289

(51) Int. Cl.
*F21V 8/00*    (2006.01)

(52) U.S. Cl.
CPC .......... *G02B 6/0083* (2013.01); *G02B 6/009* (2013.01); *G02B 6/0021* (2013.01);
(Continued)

(58) Field of Classification Search
CPC .. G02B 6/0083; G02B 6/0068; G02B 6/0073; G02B 6/009; G02B 6/0021
(Continued)

(56) References Cited

U.S. PATENT DOCUMENTS 9,791,612 B1 *  10/2017  James ................. G02B 6/0045
2010/0220497 A1 *  9/2010  Ngai ..................... G02B 6/002
                                                                          362/610

(Continued)

FOREIGN PATENT DOCUMENTS

JP    2009-199971 A    9/2009

*Primary Examiner* — Claude J Brown
(74) *Attorney, Agent, or Firm* — ScienBiziP, P.C.

(57) ABSTRACT

A backlight device (12) includes a light guide plate (14), and LEDs (17), and wiring portions (18c). The light guide plate (14) has a substantially circular outer shape and has fan-shaped areas (SA) defined by segment lines (SL) extending through a center (C) thereof. All the segment lines (SL) meet at the center (C). The LEDs (17) are arranged such that middle positions between LEDs (17) each located at an end in the circumferential direction in the respective sets of the LEDs (17) provided for the fan-shaped areas (SA) adjacent to each other in the circumferential direction coincides with the segment lines (SL). The wiring portions (18c) are equal or larger in number than the LEDs (17) included in each of the sets of LEDs (17) provided for the fan-shaped areas (SA) and are configured to supply electric power to the respective LEDs (17).

14 Claims, 17 Drawing Sheets

(52) U.S. Cl.
 CPC ......... *G02B 6/0045* (2013.01); *G02B 6/0068* (2013.01); *G02B 6/0073* (2013.01)

(58) Field of Classification Search
 USPC ........................................................ 362/613
 See application file for complete search history.

(56) References Cited

U.S. PATENT DOCUMENTS

| | | | |
|---|---|---|---|
| 2012/0236593 A1* | 9/2012 | Wei | F21S 8/03 362/609 |
| 2015/0306958 A1* | 10/2015 | Birman | B60K 37/02 340/438 |
| 2017/0205561 A1* | 7/2017 | Thompson | G02B 6/0045 |
| 2017/0276859 A1* | 9/2017 | Katsumata | G02B 6/0068 |
| 2017/0371089 A1* | 12/2017 | Sahlhoff | G02B 6/0031 |

\* cited by examiner

LIGHTING DEVICE AND DISPLAY DEVICE

TECHNICAL FIELD

The present invention relates to a lighting device and a display device.

BACKGROUND ART

A liquid crystal display device has been conventionally used as a display device in a small and thin device such as a notebook computer, a mobile phone, and a mobile television. In addition, a liquid crystal display device is increasingly used as a display device of an automotive instrument for displaying vehicle information or traffic information. Such a liquid crystal display device includes a lighting device configured to illuminate the liquid crystal panel. The lighting device includes a light source and a light guide plate configured to convert a light flux emitted by the light source into a planar light flux suitable for illumination of the liquid crystal panel. One known example of the lighting device of this kind is described in Patent Document 1 listed below. Patent Document 1 describes a lighting device including a light source and a light guide member. The light from the light source enters the light guide member through the light entrance portion and exits from the light guide member through the light output portion to illuminate the liquid crystal panel, which is a member to be illuminated. The light guide member has a substantially circular shape. The light source includes a plurality of light sources. The light sources are disposed on a peripheral edge of the light guide member such that all the output directions of light from the light sources intersect.

RELATED ART DOCUMENT

Patent Document

Patent Document 1: Japanese Unexamined Patent Application Publication No. 2009-199971

PROBLEM TO BE SOLVED BY THE INVENTION

In the above-described Patent Document 1, since all the output directions of light from the light sources intersect, i.e., predetermined light sources do not directly face each other, concentration of the light is unlikely to occur, reducing uneven illumination. Meanwhile, the light sources are electrically connected to the substrate, and the electric power is supplied thereto from a power supply through the substrate. Thus, in case of a malfunction of any one of the light sources or breaking of any one of the wiring lines on the substrate, one or more of the light sources will become inoperative. The inoperative light source of the light sources significantly reduces the amount of light applied to the area directly facing the inoperative light source, leading to generation of a local dark portion.

DISCLOSURE OF THE PRESENT INVENTION

The present invention was made in the above-described circumstance and an object thereof is to reduce the uneven brightness.

Means for Solving the Problem

The lighting device according to the invention includes a light guide plate, a plurality of light sources, and a plurality of power supply portions. The light guide plate has a substantially circular or elliptical outer shape and has a plurality of fan-shaped areas defined by segment lines extending through the center thereof. All the segment lines meet at the center. The plurality of light sources are arranged next to each other in a circumferential direction of the light guide plate to surround the light guide plate. The plurality of light sources include sets of multiple light sources provided for the plurality of fan-shaped areas. Each of the sets of multiple light sources is provided for each of the plurality of fan-shaped areas. The sets of multiple of light sources included in the plurality of fan-shaped areas that are adjacent to each other are arranged such that a middle position between the light sources each located at an end in the circumferential direction in each of the respective sets of the multiple light sources adjacent to each other is on one of the segment lines. A number of the plurality of power supply portions is equal to or larger than a number of the multiple light sources in each of the sets of multiple light sources provided for the plurality of fan-shaped areas. The plurality of power supply portions are configured to supply electric power to the respective multiple light sources provided for each of the plurality of fan-shaped areas.

In this configuration, the light guide plate having a substantially circular or elliptical outer shape allows light from, the plurality of light sources, which are arranged next to each other in the circumferential direction, to enter thereinto, and guides the light therethrough and then outputs the light therefrom. The fan-shaped areas are defined by the segment lines located at the middle positions between the light sources each located at the end in the circumferential direction in the respective sets of the multiple of light sources provided for the fan-shaped areas adjacent to each other in the circumferential direction, and all the segment lines meet at the center of the light guide plate. Thus, when the light is applied to the fan-shaped areas from the sets of the multiple light sources provided for the fan-shaped areas, the light travels over the center of the light guide plate to positions close to the segment lines, i.e., the border between the fan-shaped areas adjacent to each other in the circumferential direction. In general, the amount of light inside the light guide plate is likely to insufficient at the position near the border between the fan-shaped areas adjacent to each other, but the above-described configuration reduces the unevenness in amount of light in the plate surface of the light guide plate.

In addition, the plurality of power supply portions, which are equal or larger in number than the multiple light sources provided for each of the fan-shaped areas, supply power to each of the multiple light sources provided for each of the fan-shaped areas. If any one of the multiple light sources provided for the fan-shaped area becomes inoperative due to a malfunction of any one of the multiple light sources provided for the fan-shaped area or breaking of any one of the power supply portions, for example, power is kept supplied to the other light sources by the other power supply portion. Thus, a local darkness portion is unlikely to be generated by the inoperative light source.

The following configurations are preferable as aspects of the present invention.

(1) The plurality of fan-shaped areas of the light guide plate have the same central angle and the number of fan-shaped areas is an odd number of three or more. In this configuration, the amount of output light from the light guide plate is readily equalized in the fan-shaped areas, compared with a configuration including a plurality of fan-shaped areas having different central angles, reliably reducing the uneven brightness.

(2) The same number of the multiple light sources is included in each of the sets of multiple light sources provided for the plurality of fan-shaped areas. In this configuration, the amount of output light from the light guide plate is readily equalized in the fan-shaped areas by equalization of power supplied to the multiple light sources provided for each of the fan-shaped areas. This simplifies the structure of the power supply portion.

(3) The plurality of light sources are arranged such that light sources connected to the same one of the plurality of power supply portions in the plurality of fan-shaped areas form the same central angle If any one of the power supply portions is broken, all the light sources connected to the broken power supply portion may be inoperative. In such a case, since the plurality of light sources in this embodiment are arranged such that the light sources connected to the same power supply portion form the same central angle in the fan-shaped areas, the remaining operative light sources are arranged with am equal angular space therebetween. This configuration enables power to be supplied to the remaining operative light sources through the other power-supply portion when all the light sources connected to the broken power supply portions are inoperative, reducing the possibility that the output light from the light guide plate will have uneven brightness in the plate surface thereof.

(4) The plurality of light sources are arranged such that a distance between the multiple light sources in each of the sets of multiple light sources provided for the plurality of fan-shaped areas is smaller than a distance between the light-sources each located at an end in the circumferential direction in each of the respective sets of the multiple light sources provided for the plurality of fan-shaped areas adjacent to each other in the circumferential direction. In this configuration, when any one of the multiple light sources provided for the fan-shaped area becomes inoperative, the remaining operative light source is located closer to the inoperative light source than to the light source at the end in the circumferential direction of the multiple light sources provided for the adjacent fan-shaped area. This configuration enables the operative light source to supplement the operation of the inoperative light source and exhibit approximate optical properties, and thus a local darkness portion is unlikely to be generated by the inoperative light source.

(5) The plurality of light sources are arranged such that a central position between the light sources located at ends in the circumferential direction in each of the sets of the multiple light sources provided for the fan-shaped areas coincides with a central position of each of the fan-shaped areas in the circumferential direction. In this configuration, when the light emitted by the multiple light sources provided for the fan-shaped area enters the light guide plate, the light travels in the fan-shaped area while reliably spreading from the central side toward each end in the circumferential direction. In this configuration, the amount of output light from the light guide plate is readily equalized in the fan-shaped areas, reliably reducing uneven brightness.

(6) The light guide plate has a plurality of light entrance surfaces for each of the plurality of fan-shaped areas in an outer peripheral surface. The plurality of light entrance surfaces are parallel to light-emitting surfaces of the plurality of light sources such that light from the plurality of light sources is applied to the plurality of light entrance surfaces. Since the light entrance surfaces of the light guide plate is parallel to the light-emitting surfaces of the light sources, the light from the light sources enters through the light entrance surfaces with high light entrance efficiency.

(7) The light guide plate includes the cutouts having the plurality of light entrance surfaces. The cutouts are obtained by cutting out the outer peripheral portion in the circumferential direction, and the plurality of light sources are arranged such that a part of each of the plurality of light sources is in one of the cutouts. This configuration, in which the at least a portion of the plurality of light sources is positioned in the cutout, reduces the frame size of the lighting device compared with a configuration in which a light guide plate has protrusions protruding outwardly from the outer peripheral portion at positions away from each other in the circumferential direction and each protrusion has the light entrance surface.

(8) At least a part of each of the plurality of light sources included in one of the plurality of fan-shaped areas is collectively in each of the cutouts. Each of the cutouts has the light entrance surfaces and the number of the cutouts is equal to the number of plurality of fan-shaped areas. In this configuration, the outer shape of the light guide plate is unlikely to be complex compared to a configuration in which the cutout is provided for each of the multiple light sources provided for the fan-shaped area. Furthermore, the light from the multiple light sources each having a portion collectively positioned in the cutout is applied to the light entrance surfaces of the cutout and travels through the light guide plate.

(9) The light guide plate includes a central portion that is an effective light output area through which the light effectively exits and the outer peripheral portion that is an ineffective light output area surrounding the effective light output area and having the cutouts. In this configuration, since the cutout is provided in the ineffective light output area surrounding the effective light output area and the cutout is not provided in the effective light output area through which the light effectively exits, the cutout is unlikely to affect the output light from the effective light output area, reliably reducing the uneven brightness.

(10) The plurality of light sources are arranged such that the sets of the multiple light sources provided for the plurality of fan-shaped areas each includes one light source having a light-emitting surface tilted with respect to another light source. In this configuration, the light that has entered the light guide plate from the light sources provided for each of the fan-shaped areas travels in the fan-shaped area while spreading wider in the circumferential direction. This reliably reduces the uneven brightness.

(11) The plurality of light sources are arranged such that the multiple light sources provided for each of the plurality of fan-shaped areas include one light source on one side in the circumferential direction having the light-emitting surface facing one side in the circumferential direction and another light source on another side in the circumferential direction having a light-emitting surface facing another side in the circumferential direction. The light guide plate has cutouts each obtained by cutting out a part of an outer peripheral portion of the light guide plate in the circumferential direction. Each of the cutouts has a plurality of light entrance surfaces parallel to the light-emitting surfaces of the multiple light sources provided for each of the plurality of fan-shaped areas. Light from the plurality of light sources enters through the plurality of light entrance surfaces. At least a portion of each of the multiple light sources provided for the plurality of fan-shaped areas is collectively positioned in each of the cutouts. The number of the cutouts is equal to the number of the plurality of fan-shaped areas. In this configuration, for example, light sources located at one side and another side in the circumferential direction of the multiple light sources provided for the fan-shaped area would come in contact with the light entrance surfaces of the cutout at the light-emitting surfaces if the light guide plate turns. This limits the displacement of the light guide plate in the circumferential direction. Furthermore, since at least a portion of each of the light sources provided for the fan-shaped areas is collectively positioned in the cutout, the width of the frame of the lighting device is reduced and the outer shape of the light guide plate is unlikely to be complex.

(12) A light source board is provided and the plurality of light sources are mounted thereon. The light source board includes a plurality of power supply wiring portions constituting the plurality of power supply portions. The plurality of power supply wiring portions are connected to the respective light sources in each of the sets of the multiple light sources provided for the plurality of fan-shaped areas. In this configuration, compared with a configuration in which an electric power wiring portion is a separate component from the light source board, the number of components and the number of assembling steps are small, reliably reducing the cost.

Next, to solve the above-described problems, the display device according to the invention includes the above-described lighting device, and a display panel configured to provide a display by using light from the lighting device.

Since the lighting device configured to supply light to the display panel is unlikely to generate uneven brightness, the liquid crystal display device having the above-described configuration is able to display an image with high display quality.

Advantageous Effect of the Invention

In the present invention, the uneven brightness is reduced.

MODE FOR CARRYING OUT THE INVENTION

First Embodiment

Figure 1:
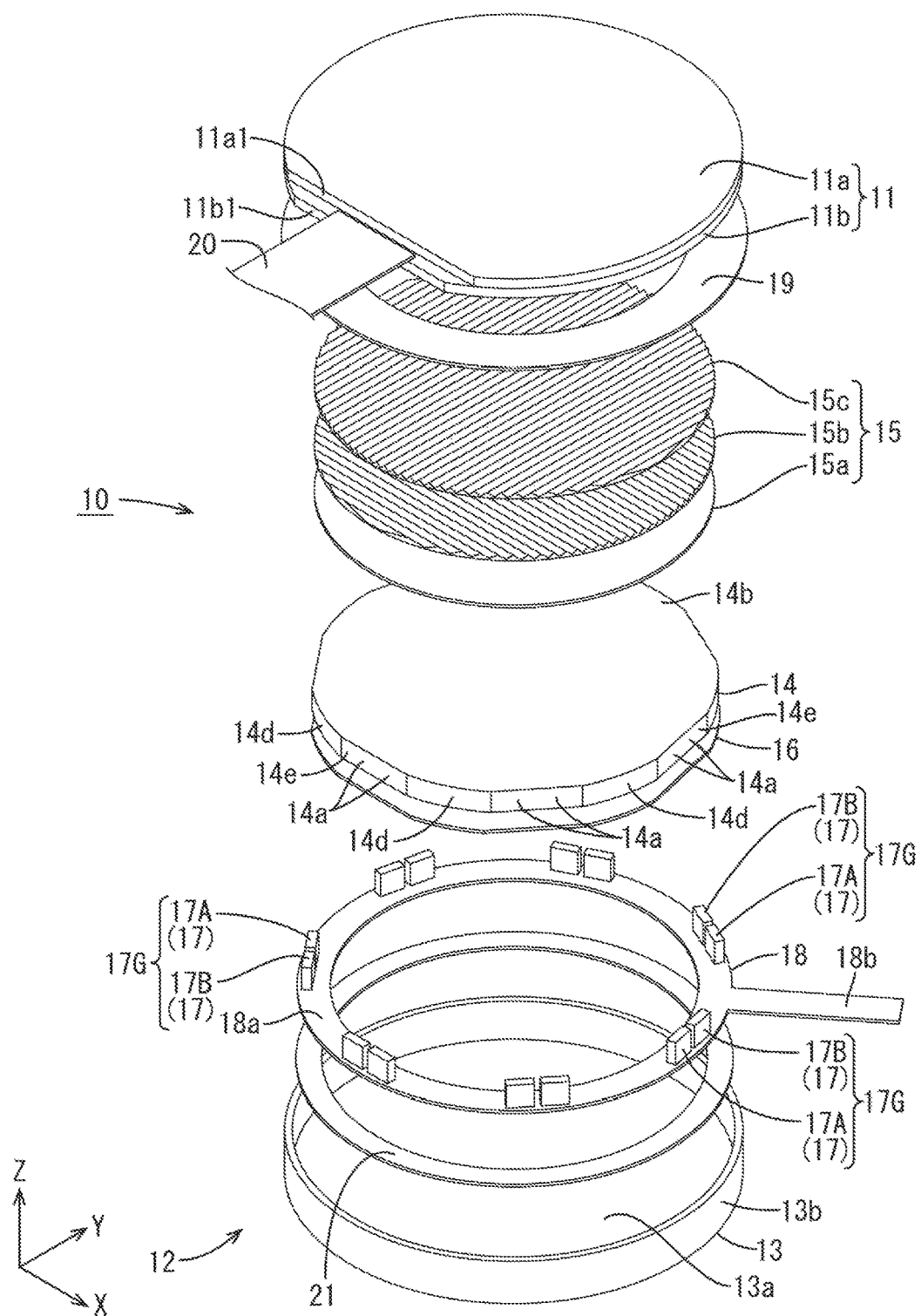
FIG. 1 is an exploded perspective view illustrating a liquid crystal display device according to a first embodiment of the invention.

A first embodiment of the invention is described with reference to FIG. 1 to FIG. 7. In this embodiment, as a display panel, a liquid crystal display device (a display device) 10 including a liquid crystal panel 11 is described as an example. The X axis, the Y axis, and the Z axis are indicated in some of the drawings, and each of the axes indicates the same direction in the drawings. The up and down direction is based on that of FIG. 3 and FIG. 4, and the upper side and the lower side are a front side and a rear side, respectively.

The liquid crystal display device 10 has a substantially circular overall shape, and at least includes, as illustrated in FIG. 1, a liquid crystal panel (a display panel) 11, which is configured to display an image, and a backlight device (a lighting device) 12, which is located on a rear side of the liquid crystal panel 11 and configured to apply light to the liquid crystal panel 11 for displaying an image. Although not illustrated, the liquid crystal display device 10 may include a bezel at a position between the backlight device 12 and the liquid crystal panel 11. The bezel holds the outer peripheral end of the liquid crystal panel 11. The liquid crystal display device 10 according to this embodiment is preferably used in electric devices (not illustrated). Examples of the electric devices include, but are not limited to, a mobile phone (including a smart phone), a smart watch, a four-wheel vehicle instrument (a vehicle-mounted meter), a two-wheel vehicle instrument (a motorcycle-mounted meter), a notebook computer (including a tablet computer and the like), a mobile information terminal (including an electronic book and PDA), a digital photo frame, and a handheld gaming device. Thus, the liquid crystal panel 11 constituting the liquid crystal display device 10 preferably has a screen size of about a few inches to a dozen inches, which is categorized as a small size or a small to medium size in general, although the screen size is not limited thereto.

Figure 3:
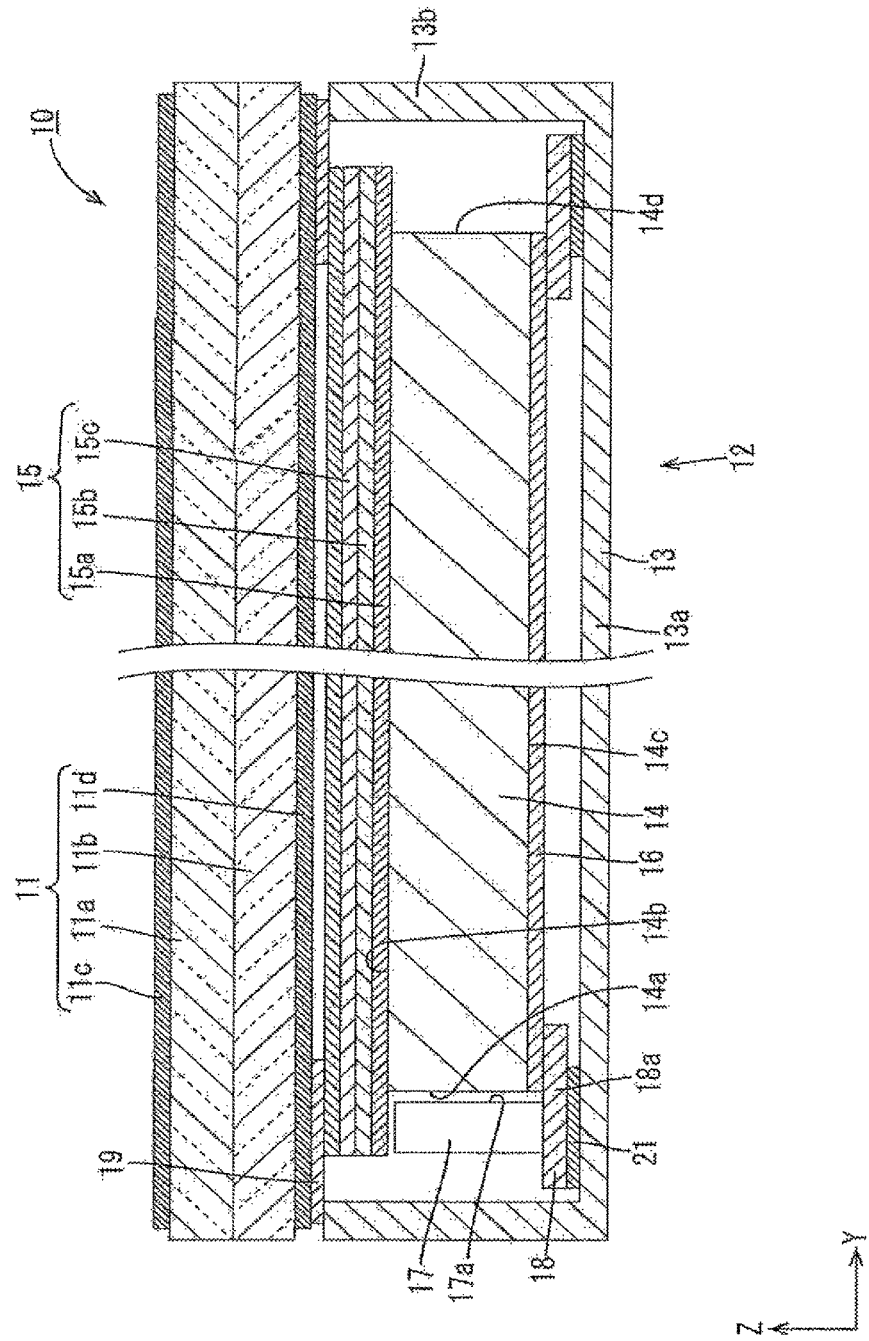
FIG. 3 is a cross-sectional view taken along line iii-iii in FIG. 2.

First, the liquid crystal panel 11 is described in detail. As illustrated in FIG. 1, the liquid crystal panel 11 has a substantially circular overall shape in plan view. As illustrated in FIG. 3, the liquid crystal panel 11 includes two substrates 11a and 11b, which are almost transparent and formed of glass having high light transmission properties, and a liquid crystal layer (not illustrated) including liquid crystal molecules, which are substances whose optical properties are changed by application of an electrical field, between the substrates 11a and 11b. The substrates 11a and 11b are bonded together by a sealant, which is not illustrated, with a gap corresponding to the thickness of the liquid crystal layer therebetween. The liquid crystal panel 11 includes a substantially circular display area (an active area) located at the central position of the screen and configured to display an image and a substantially ring-shaped (substantially circular frame shaped or doughnut shaped) non-display area (a non-active area) located to surround the display area at an outer peripheral side of the screen and configured to display no image. The liquid crystal panel 11 is configured to display an image on the display area by using light from the backlight device 12 and a front side thereof is a light output side. Light polarizing plates 11c and 11d are respectively attached to outer surfaces of the substrates 11a and 11b.

Of the substrates 11a and 11b included in the liquid crystal panel 11, one on the front side (front surface side) is a CF substrate 11a and one on the rear side (rear surface side) is an array substrate 11b. Many TFTs (Thin Film Transistors), which are switching elements, and many pixel electrodes are disposed next to each other in a matrix (in rows and columns) on the inner surface (side adjacent to the liquid crystal layer, side facing the CF substrate 11a) of the array substrate 11b over the display area, and gate wiring lines and source wiring lines disposed in a grid shape surround the TFTs and the pixel electrodes. Signals relating to an image are supplied to each of the gate wiring lines and the source wiring lines by a driver (not illustrated). The pixel electrodes in a quadrangular area surrounded by the gate wiring lines and the source wiring lines are each formed of a transparent electrode material such as ITO (Indium Tin Oxide) or ZnO (Zinc Oxide). Furthermore, a gate circuit portion (a scanning circuit portion), which is configured to supply gate signals (scanning signals) to the gate wiring lines to sequentially scan and selectively drive the TFTs, is disposed on the inner surface of the array substrate 11b over the display area. The gate circuit portion, which is a monolithic circuit on the array substrate 11b, includes the same semiconductor film (preferably an oxide semiconductor material) as the TFT as a base and has a control circuit configured to control the supply of the output signals (gate signals) to the TFT. The gate circuit portion is provided by dispersedly positioning various circuit elements (TFTs for control circuit) constituting the control circuit in the pixels in a predetermined area of the display area. The configuration having the gate circuit portion in the display area reduces the frame width of the non-display area compared with a configuration having the gate circuit portion in the non-display area, leading to a reduction in the frame width of the liquid crystal panel 11 and the liquid crystal display device 10. Furthermore, since the gate circuit portion is provided in the display area, the outer shape of the liquid crystal panel 11 is able to be determined with high degree of freedom. Meanwhile, many color filters are arranged in a matrix at positions corresponding to the pixels on the inner surface of the CF substrate 11a. The color filters include alternatively arranged R, G, B color portions. A light blocking layer (black matrix) is disposed between each of the color portions to prevent mixture of colors. A counter electrode facing the pixel electrodes on the array substrate 11b is disposed on surfaces of the color filters and surfaces of the light blocking layers. Furthermore, alignment films (not illustrated) for orienting the liquid crystal molecules in the liquid crystal layer are provided on the inner surfaces of the substrates 11a and 11b.

As illustrated in FIG. 1, the CF substrate 11a and the array substrate 11b included in the liquid crystal panel 11 respectively have straight edges 11a1 and 11b1 each obtained by cutting out the outer peripheral portion having a substantially circular overall shape along a straight line. The cutout of the CF substrate 11a is larger in width than that of the array substrate 11b. Thus, the straight edge 11b1 of the array substrate 11b is located outwardly in a radial direction in relation to the straight edge 11a1 of the CF substrate 11a. Then, a flexible substrate 20, which is configured to supply various signals relating to a display image, is disposed in the non-display area, which is an outer peripheral portion of the array substrate 11b, at a position corresponding to the straight edge 11b1 in the circumferential direction, and a panel side terminal (not illustrated), which is connected to the flexible substrate 20, is also provided at the position. The flexible substrate 20 is disposed and the panel side terminal is provided in the non-display area of the array substrate 11b over a belt-shaped area having a constant width between the straight edge 11a1 of the CF substrate 11a and the straight edge 11b1 of the array substrate 11b in plan view. The flexible substrate 20 at least includes a film-like base member formed of a synthetic resin material having insulation properties and flexibility (polyimide-based resin, for example) and wiring patterns (not illustrated) routed on the substrate. One end of the flexible substrate 20 is connected to the liquid crystal panel 11 and the other end thereof is connected to a control board, which is not illustrated. Thus, various signals relating to a display image, which are supplied from the control board, are transmitted to the liquid crystal panel 11. As described above, since the liquid crystal panel 11 according to this embodiment includes the straight edges 11a1 and 11b1, the planar shape thereof is not strictly a true circular overall shape. However, the planar shape of the liquid crystal panel 11 may be a true circular shape. In such a case, the display area on which an image is displayed may have a true circular shape in plan view. Employment of the liquid crystal panel 11 having such a true circular shape enables a unique user interface design in which a display image in the display area is rotated when an outer periphery of the liquid crystal display device 10 where a position sensor, for example, is installed is touched by a user.

Next, the configuration of the backlight device 12 is described in detail. The backlight device 12 has a substantially circular shape in plan view as the liquid crystal panel 11 and a block-like overall shape. As illustrated in FIG. 1 to FIG. 4, the backlight device 12 at least includes a chassis (a housing) 13, which has a box-like shape opening toward the liquid crystal panel 11, a plurality of LEDs (Light Emitting Diodes) 17 as light sources, an LED board (a light source board) 18 on which the LEDs 17 are mounted, a light guide plate 14, which is disposed on the front side of the chassis 13 and configured to guide the light from the LEDs 17, a plurality of optical sheets 15, which is disposed on the front side (a light output side) of the light guide plate 14 and configured to provide the output light from the light guide plate 14 with optical properties before the output light exits toward the liquid crystal panel 11 therethrough, and a reflective sheet 16, which is sandwiched between the chassis 13 and the light guide plate 14 and configured to reflect the light toward the light guide plate 14. In the backlight device 12, the light from the LED 17 is converted to planer light by the optical properties of the light guide plate 14, the optical sheet 15, and the reflective sheet 16, and the light exits through the opening of the chassis 13 toward the liquid crystal panel 11. In other words, the front side of the backlight device 12 is a light output side. Hereinafter, the components of the backlight device 12 are described in sequence. The Z-axis direction in the drawings corresponds to the normal direction of the plane surfaces of the light guide plate 14, the optical sheet 15, and the reflective sheet 16, and also corresponds to an overlapping direction in which the chassis 13, the light guide plate 14, the optical sheet 15, and the reflective sheet 16 overlap each other.

The chassis 13 is formed of a synthetic resin material or a metal material. As illustrated in FIG. 1 to FIG. 4, the chassis 13 has a substantially circular planar shape in plan view and a box-like shape (a cylindrical shape with a bottom) opening toward the front side and houses the LED board 18, the light guide plate 14, the optical sheet 15, and the reflective sheet 16 therein. The chassis 13 has a substantially circular overall shape in plan view (viewed in the Z-axis direction) as the liquid crystal panel 11, for example. The chassis 13 includes a bottom wall 13a and a side wall 13b extending upward from the outer peripheral edge of the bottom wall 13a toward the front side. The bottom wall 13a has a plate surface parallel to the plate surface of each of the light guide plate 14, the optical sheet 15, the reflective sheet 16, and the liquid crystal panel 11 and supports the light guide plate 14, the optical sheet 15, and the reflective sheet 16, which are housed in the chassis 13, from the rear side. The side wall 13b surrounds the light guide plate 14, the optical sheet 15, the reflective sheet 16, and the LED board 18 (LEDs 17), which are housed in the chassis 13, from the outside and has a ring-like overall shape (substantially circular frame shape). Furthermore, a panel fixation tape 19, which fixes the liquid crystal panel 11 to the backlight device 12, is fixed to the front end of the side wall 13b at the rear surface of the outer peripheral portion. The panel fixation tape 19 is a double-sided tape having an adhesive surface on each side of its base member and is fixed to both the side wall 13b and the optical sheet 15, which is described later (specifically, a second lens sheet 15c, which is described later), and the liquid crystal panel 11.

As illustrated in FIG. 1 to FIG. 4, the LED 17 has a configuration in which an LED chip (LED device), which is a semiconductor light-emitting element, is sealed with a resin material on a base plate fixed to the plate surface of the LED board 18. The LED 17 includes an anode terminal and a cathode terminal, which are not illustrated, and is configured to emit light from the LED chip when a direct current, which is forward bias, flows between the terminals. The LED chip on the base plate emits light in one main emission wavelength range, specifically, emits light in a single color of blue. Meanwhile, the resin material sealing the LED chip includes a fluorescent material in a dispersed state. The fluorescent material excited by the blue light from the LED chip emits a predetermined color (yellow, green, or red, for example). The LED 17 as a whole emits white light. The LED 17 is a side surface light emitting type LED and has a light-emitting surface 17a at a side adjacent to the surface attached to the LED board 18. The light-emitting surface 17a of the LED 17 is straight in plan view. The height of the LED 17 is smaller than the thickness of the light guide plate 14, which is described later, and is about 0.4 mm, for example. The optical axis of the LED 17 is parallel to the normal direction of the light-emitting surface 17a. The "optical axis" here is a traveling direction of the light having the highest emission intensity in the light emitted from the LED 17 (intensity distribution).

As illustrated in FIG. 1, FIG. 3, FIG. 4, and FIG. 6, the LED board 18 is formed of an insulating material (polyimide, for example) and is a flexible film (sheet), and the plate surface is parallel to the plate surface of the bottom wall 13a of the chassis 13, for example. The LED board 18 includes a board body 18a, which has an endless ring shape extending in the circumferential directions of the light guide plate 14, the optical sheet 15, and the reflective sheet 16, and an extended portion 18b, which extends outwardly from a portion of the board body 18a in a radial direction. The board body 18a having an endless ring shape has an inner diameter smaller than outer-diameters of the light guide plate 14 and the reflective sheet 16 and an outer diameter substantially equal to the outer diameters of the light guide plate 14 and the reflective sheet 16. The board body 18a overlaps the outer peripheral portions of the light guide plate 14 and the reflective sheet 16 from the rear side. The board body 18a is fixed to the bottom wall 13a of the chassis 13, which is located on the rear side of the board body 18a, with an LED board fixation tape 21 therebetween. The LED board fixation tape 21 is a double-sided tape having an adhesive surface on each surface of its base member. Wiring portions (power supply wiring portion, power supply) 18c configured to supply power to the LEDs 17 mounted on the board body 18a are patterned on the board body 18a, The specific pattern of the wiring portion 18c is described later in detail. The "radial direction" herein is a direction in which a distance from the center of a circular component or a ring-shaped component (such as the light guide plate 14 and the LED board 18) changes and the "circumferential direction" is a direction in which a distance from the center does not change.

Figure 4:
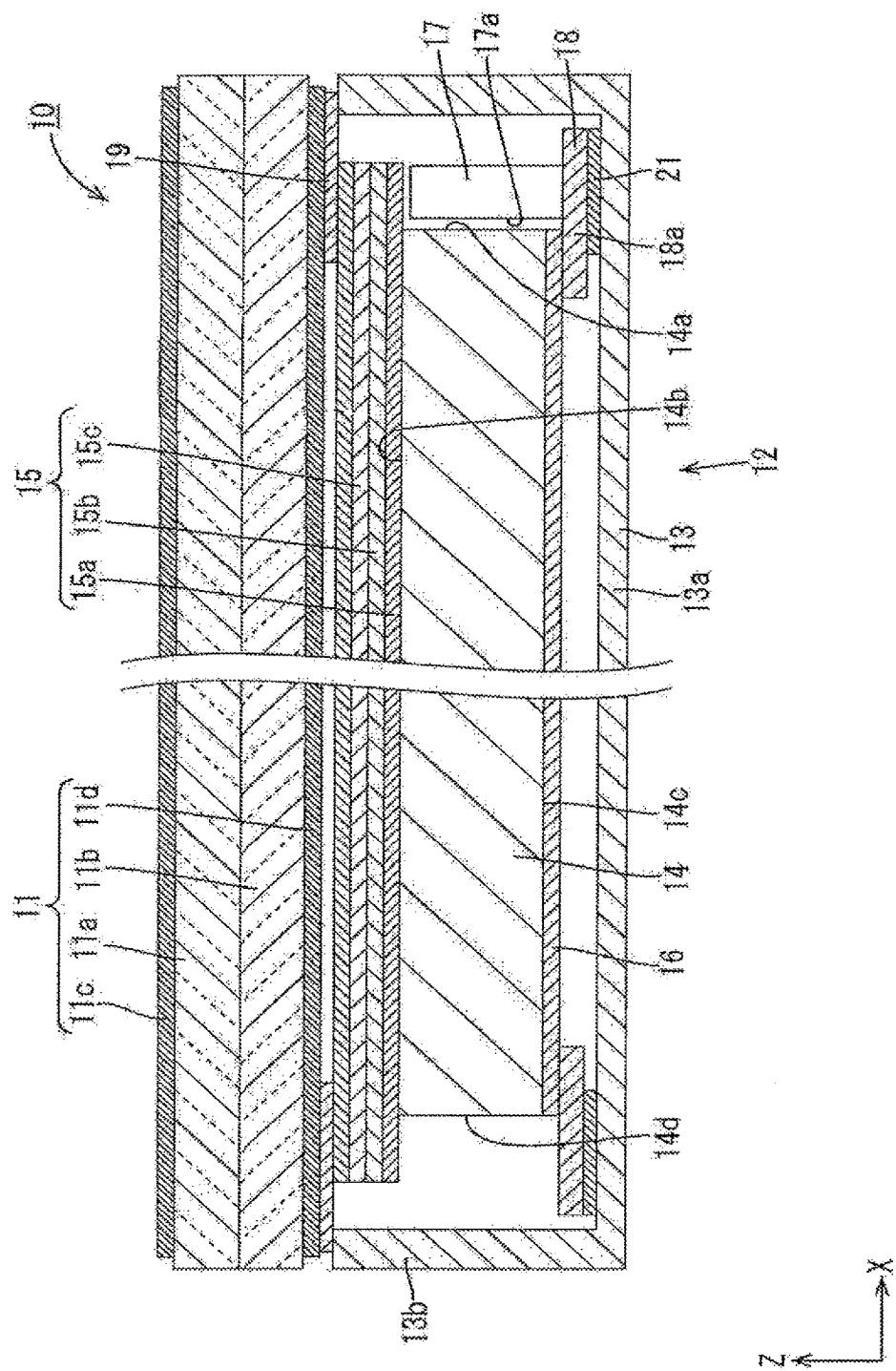
FIG. 4 is a cross-sectional view taken along line iv-iv in FIG. 2.
Figure 6:
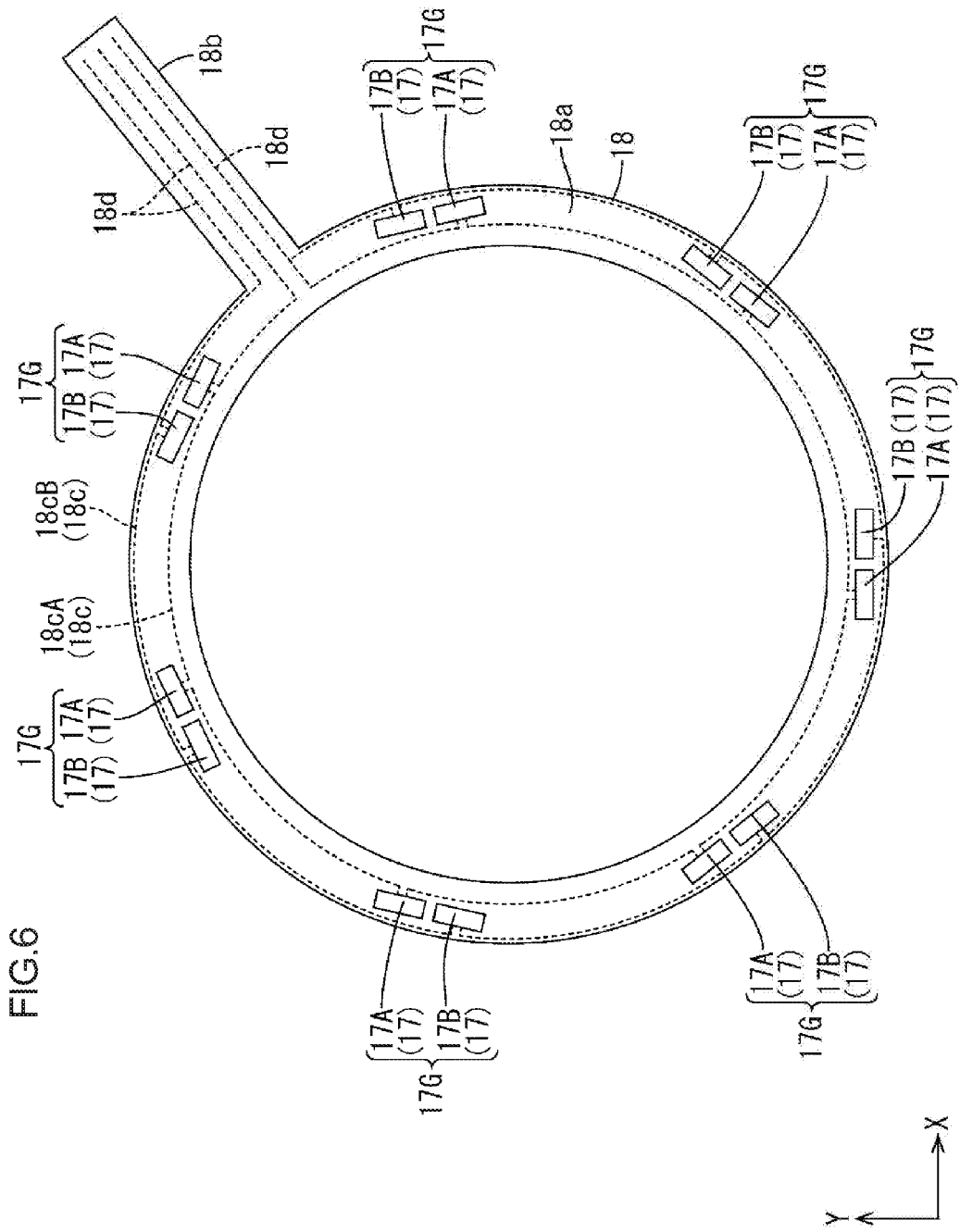
FIG. 6 is a bottom view of an LED board.

As illustrated in FIG. 3, FIG. 4, and FIG. 6, the LEDs 17 are mounted on the front plate surface, which is one of the front and rear plate surfaces of the board body 18a of the LED board 18, and the terminals of the LEDs 17 are soldered for mechanically and electrically connection. The LEDs 17 on the board body 18a are arranged in a ring shape (in an annular shape and a curved shape) in the circumferential direction with a predetermined distance therebetween in the circumferential direction. The specific arrangement of the LEDs 17 is described later. An extended portion 18b continuously extends from a portion between predetermined LEDs 17, which are located next to each other in the circumferential direction, and extends substantially straight in a radially outward direction from the portion. The extended portion 18b includes extended wiring portions 18d extending continuously from the wiring portions 18c of the board body 18a. The extended wiring portion 18d extends straight in the extending direction of the extended portion 18b and has power supply terminals 18d1 and 18d2 (see FIG. 6) at its end in an exposed manner. As illustrated in FIG. 6, the power supply terminals 18d1 and 18d2 include two anode-side power supply-terminals 18d1 and two cathode-side power supply terminals 18d2. The extended wiring portions 18d include one extended wiring portion 18d connected to the two anode-side power supply terminals 18d1 and two extended wiring portions 18a separately connected to the two cathode-side power supply terminals 18d2. The extended portion 18b is located outside the backlight device 12 through an opening (not illustrated) in the bottom wall 13a of the chassis 13. The extended portion 18b passed through the opening is connected to a power supply connector of an LED drive circuit board (not illustrated), which is located on the rear side of the chassis 13, at the above-described terminals.

Figure 5:
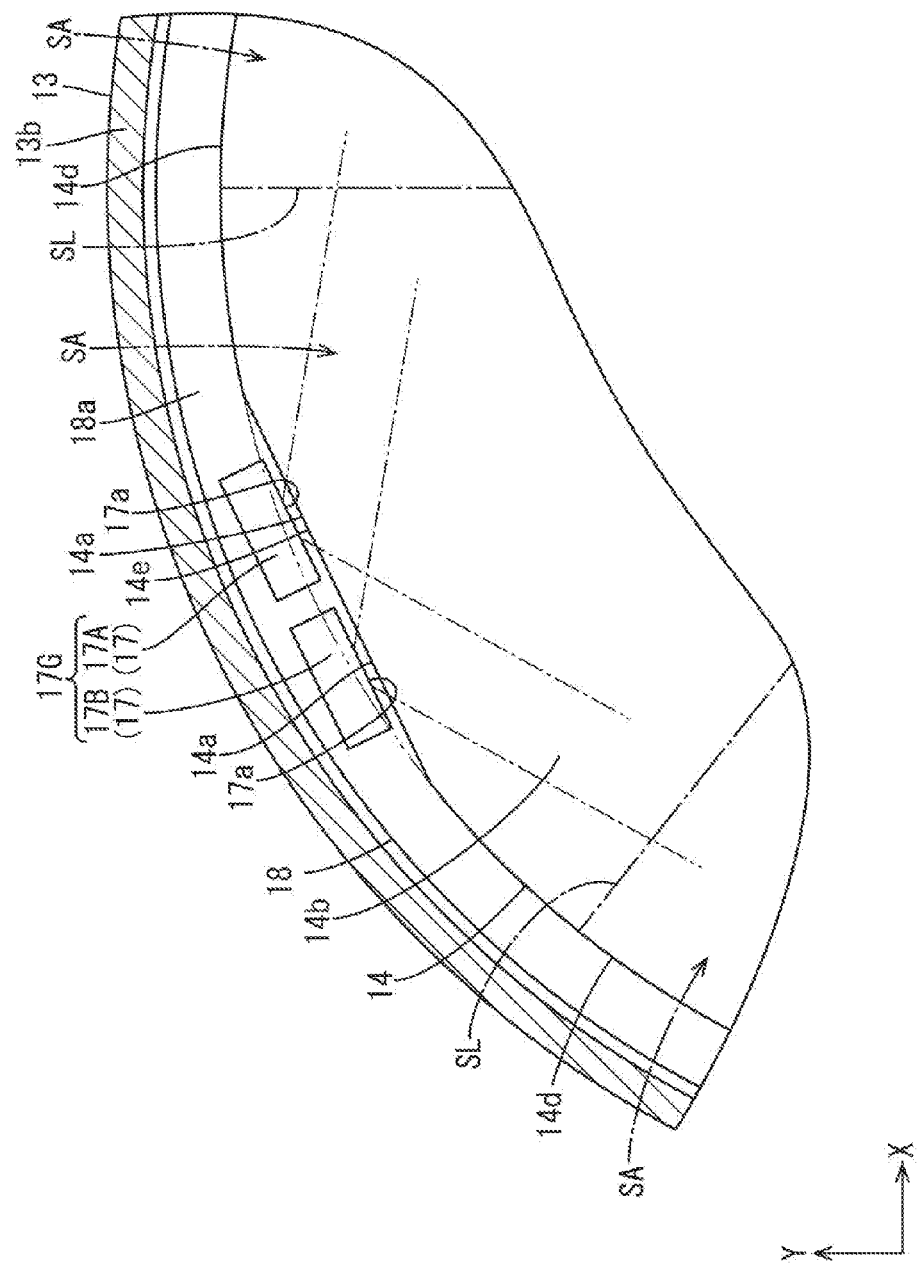
FIG. 5 is a magnified plan view of the backlight device.

As illustrated in FIG. 1 to FIG. 4, the light guide plate 14 is formed of a synthetic resin (for example, an acrylic resin such as PMMA, or a polycarbonate (PC)) and has a substantially circular shape in plan view as the bottom wall 13a of the chassis 13. The outer diameter of the light guide plate 14 is slightly smaller than that of the bottom wall 13a of the chassis 13. In other words, the light guide plate 14 has an outer shape corresponding to the arrangement of the LEDs 17 arranged in a ring shape on the LED board 18. The light guide plate 14 is housed in the chassis 13 and surrounded by the side wall 13b at a position directly below the liquid crystal panel 11 and the optical sheet 15. The outer peripheral surface of the light guide plate 14 has LED-facing portions (light source facing portions) facing the LEDs 17 and LED non-facing portions (light source non-facing portion) not facing the LEDs 17. The LED-facing portions are light entrance surfaces 14a to which the light from the LEDs 17 is directly applied. As illustrated in FIG. 5, the light entrance surfaces 14a are parallel to the light-emitting surfaces 17a of the LEDs 17 and are straight in plan view. In other words, the light entrance surfaces 14a are obtained by cutting out the outer peripheral portion of the light guide plate 14 along a straight line at positions away from each other in the circumferential direction. Thus, the light guide plate 14 does not have the outer peripheral surface in a true circular overall shape and has a shape having straight chords at positions away from each other in the circumferential direction. In a cutout 14e, which is provided when the light entrance surface 14a is formed at the outer peripheral portion of the light guide plate 14, a portion of the LED 17 facing the light entrance surface 14a is located. In other words, the LED 17 intersects an imaginary line (indicated by a two-dotted chain line in FIG. 5) indicating an outer peripheral surface of a light guide plate having a true circular shape, i.e., lies at the same position as the imaginary line in the radial direction. The cutout 14e has an arcuate area defined by the above-described imaginary line and the light entrance surface 14a. In contrast, the LED non-facing portions are non-light entrance surfaces 14d to which almost no light from the LEDs 17 is directly applied. The non-light entrance surface 14d has an arc-like shape in plan view. The arrangement or the other configurations of the light entrance surfaces 14a and the non-light entrance surfaces 14d in the circumferential direction is described in detail later. As illustrated in FIG. 3 and FIG. 4, the thickness of the light guide plate 14 is larger than the height of the LED 17, and is about 0.6 mm, for example. However, when a further reduction, in thickness is demanded, the light guide plate 14 may nave the thickness substantially equal to or smaller than the height of the LED 17. In such a case, a light blocking treatment (light leakage prevention treatment) is preferably performed to obtain high display performance. In this embodiment, although the LED non-facing portion is referred to as the "non-light entrance surface 14d", it does not mean that no light is applied to the LED non-facing portion. For example, light leaked outside through the non-light entrance surface 14d may be applied to the non-light entrance surface 14a when the light reflected by the side wall 13b returns.

Figure 2:
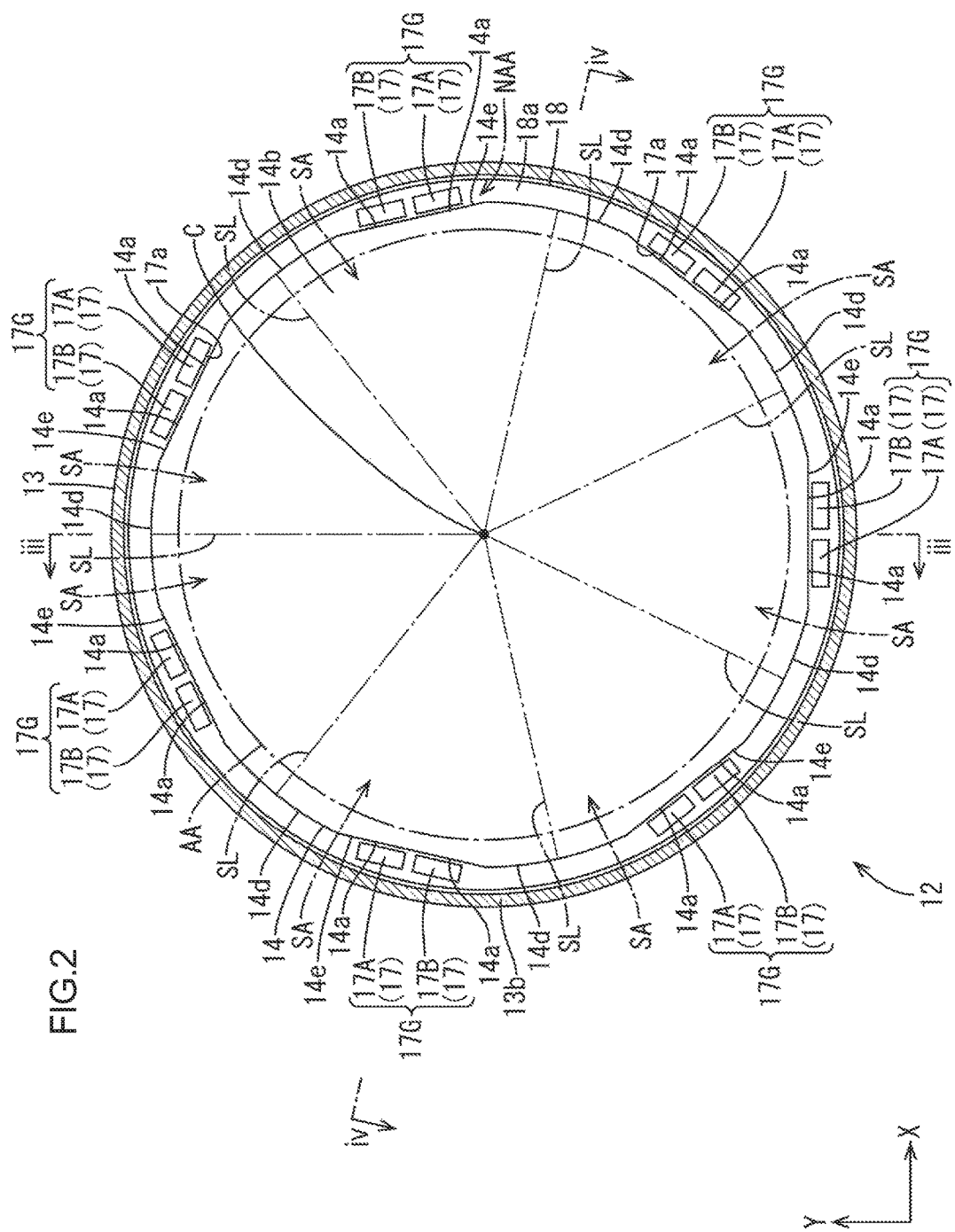
FIG. 2 is a plan view illustrating a backlight device included in the liquid crystal display device.

As illustrated in FIG. 2 to FIG. 4, the plate surface of the light guide plate 14 facing the front side (side adjacent to the liquid crystal panel 11), which is one of the front and rear plate surfaces, is a light output surface 14b through which the light exits toward the liquid crystal panel 11. The light guide plate 14 does not allow light to effectively exit through all area of the light output surface 14b. The light output surface 14b includes an effective light output area AA, which is a circular central portion through which the light effectively exits and an ineffective light output area NAA, which is a ring-shaped outer peripheral portion surrounding the effective light exit area AA. In FIG. 2, the outline of the effective light output area AA is indicated by a one-dot chain line, and the portion outside the one-dot chain line is the ineffective light output area NAA. In contrast, the plate surface of the light guide plate 14 facing the rear side (side adjacent to the reflective sheet 16, side adjacent to the bottom wall 13a) is an opposite plate surface (reflective sheet side plate surface) 14c opposite the light output surface 14b. In this configuration, the arrangement direction in which the LEDs 17 and the light guide plate 14 are arranged and the arrangement direction in which the optical sheet 15 (the liquid crystal panel 11) and the light guide plate 14 are arranged are perpendicular to each other. The light guide plate 14 is configured to allow the light emitted by the LEDs 17 to enter through the light entrance surfaces 14a and to travel therein toward the optical sheet 15 (the front side, the light output side) such that the light exits through the light output surface 14b, which is a front plate surface. The opposite plate surface 14c of the light guide plate 14 has a light reflective pattern (not illustrated) including a light reflective portion configured to reflect the light in the light guide plate 14 toward the light output surface 14b for acceleration of the output of the light through the light output surface 14b. The light reflective portion in the light reflective pattern is composed of many light reflective dots, and the distribution density thereof changes with distance from the light entrance surface 14a (the LED 17). Specifically, the distribution density of the light reflective dots included in the light reflective portion in the radial direction of the light guide plate 14 increases as the distance from the light entrance surface 14a increases and decreases as the distance from the light entrance surface 14a decreases. The distribution density is the highest at the central position of the light guide plate 14 and the lowest at the outer peripheral edge of the light guide plate 14. In contrast, the distribution density of the light reflective dots in the circumferential direction is the highest at the central position of the non-light entrance surface 14d of the light guide plate 14 (the middle between adjacent two of the light entrance surfaces 14a) and the lowest at the central position of the light entrance surface 14a (the middle between adjacent two of the non-light entrance surfaces 14a, a position on a line perpendicular to the light-emitting surface 17a of the LED 17). Such an optimized optical design of the light reflective pattern makes the output light from the light output surface 14b of the light guide plate 14 to have high brightness uniformity.

As illustrated in FIG. 1, FIG. 3, and FIG. 4, the optical sheet 15 has a substantially circular shape in plan view as the light guide plate 14 and has the outer diameter slightly larger than that of the light guide plate 14. The optical sheet 15 is disposed on the front side of the light output surface 14b of the light guide plate 14 and located between the liquid crystal panel 11 and the light guide plate 14 so as to allow the output light from the light guide plate 14 to pass therethrough toward the liquid crystal panel 11 while providing predetermined optical properties to the light passing therethrough. The optical sheet 15 according to this embodiment includes one diffusion sheet 15a and two lens sheets 15b and 15c (a first lens sheet 15b and a second lens sheet 15c), i.e., a total of three sheets. The diffusion sheet 15a includes a large number of diffusion particles for diffusing light in a substantially transparent base member formed of a synthetic resin. The diffusion sheet 15a is disposed on the light guide plate 14 and is located closest to the light guide plate 14 among the sheets included in the optical sheet 15.

As illustrated in FIG. 1, FIG. 3, and FIG. 4, the two lens sheets 15b and 15c each include a substantially transparent base member formed of a synthetic resin and many unit lenses on one plate surface of the base member. One of the two lens sheets 15b and 15c disposed on the diffusion sheet 15a is the first lens sheet 15b and the other disposed on the first lens sheet 15b and located closest to the liquid crystal panel 11 is the second lens sheet 15c. In the first lens sheet 15b, many unit lenses each extending in a first direction along the plate surface are arranged in a second direction perpendicular to the first direction. The first lens sheet 15b selectively provides the output light with light collecting properties in the second direction (anisotropic light collecting properties), which is the arrangement direction of the unit lenses. In the second lens sheet 15c, many unit lenses each extending in the second direction along the plate surface are arranged in the first direction perpendicular to the second direction. The second lens sheet 15c selectively provides the output light with light collecting properties in the first direction, which is the arrangement direction of the unit lenses. As described above, the extending directions of the unit lenses in the first lens sheet 15b and the second lens sheet 15c are perpendicular to each other and the arrangement directions of the unit lenses therein are perpendicular to each other. Furthermore, the rear surface of the panel fixation tape 19 is attached to the outer peripheral portion of the second lens sheet 15c. The X-axis direction indicated in the drawings corresponds to the extending direction of the unit lens in the first lens sheet 15b (the first direction), and the Y-axis direction corresponds to the extending direction of the unit lens in the second lens sheet 15c (the second direction). In particular, the unit lenses in the lens sheets 15b and 15c are indicated by stripes parallel to each other in the X-axis direction or the Y-axis direction in FIG. 1.

As illustrated in FIG. 1, FIG. 3, and FIG. 4, the reflective sheet 16 covers the rear surface, i.e., the opposite plate surface 14c of the light guide plate 14, which is opposite the light output surface 14b. The reflective sheet 16 is formed of a synthetic resin sheet having a white front surface with high light reflective properties, and thus the reflective sheet 16 efficiently directs the light that has been transmitted in the light guide plate 14 and passed through the opposite plate surface 14c toward the front side (the light output surface 14b). The reflective sheet 16 has a substantially circular shape in plan view as the light guide plate 14 and the optical sheet 15 and has the outer diameter substantially equal to that of the light guide plate 14. The reflective sheet 16 is sandwiched between the light guide plate 14 and the bottom wall 13a of the chassis 13.

Here, the detailed arrangement of the LEDs 17 on the LED board 18 and the configuration of the light guide plate 14 corresponding to the arrangement are described. As illustrated in FIG. 2, two LEDs 17 are disposed close to each other in the circumferential direction on the board body 18a of the LED board 18 to constitute one LED group (a light source group) 17G. A plurality of LED groups 17G are arranged on the board body 18a with a predetermined distance (a distance at least larger than the distance between the two LEDs 17 constituting the LED group 17G) therebetween in the circumferential direction. More specifically, the LED groups 17G are arranged on the board body 18a with a substantially equal distance therebetween in the circumferential direction. The central angle between the LED groups 17G adjacent to each other in the circumferential direction, more specifically, the central angle between the middle between the two LEDs 17 and the middle between the two LEDs 17 in the LED groups 17G adjacent to each other, is "360/n" where "n" is the number of the LED groups 17G. Specifically, the specific number of the LED groups 17G is seven, i.e., an odd number of more than three. The specific central angle between the LED groups 17G adjacent to each other in the circumferential direction is about 51.43 degrees. Therefore, the line segments each connecting the middle between the sets of the two LEDs 17 in the LED groups 17G to the center C of the light guide plate 14 do not make a straight line with the center C of the light guide plate 14 therebetween, and all the line segments meet at the center C of the light guide plate 14. The LEDs 17 are each arranged such that the light-emitting surface 17a thereof is parallel to the tangent line to the outer peripheral surface of the light guide plate 14 having a substantially circular shape. The optical axis of each LED 17 passes the center C of the light guide plate 14, and the optical axes of all the LEDs 17 meet at the center C of the light guide plate 14. The LEDs 17 are arranged such that the distance in the circumferential direction between the two LEDs 17 constituting the LED group 17G is smaller than the distance in the circumferential direction between the LED groups 17G adjacent to each other in the circumferential direction or the distance in the circumferential direction between the adjacent LEDs 17 each located at the end in the respective LED groups 17G adjacent to each other in the circumferential direction. Furthermore, the distance in the circumferential direction between the two LEDs 17 constituting the LED group 17G is smaller than the width of each LED 17 (the length of the light-emitting surface 17a). In FIG. 5, the output angular range of the light from the LED 17 is indicated by one-dot chain lines.

The light guide plate 14 has as many straight light entrance surfaces 14a as the LED groups 17G in the outer peripheral surface at positions corresponding to the above-described LED groups 17G in the circumferential direction. In other words, seven light entrance surfaces 14a are arranged with a substantially equal distance therebetween in the circumferential direction in the outer peripheral surface of the light guide plate 14, and the light entrance surfaces 14a adjacent to each other in the circumferential direction form the central angle of about 51.43 degrees. The light entrance surfaces 14a to which the light from the two LEDs 17 constituting the LED group 17G is applied are connected to each other to provide an integral surface extending over the two LEDs 17. The light from both the two LEDs 17 of the LED group 17G is applied to two light entrance surfaces 14a connected to each other. The formation range of the cutout 14e extends over the two LEDs 17 constituting the LED group 17G to obtain such a light entrance surface 14a. Portions of the two LEDs 17 constituting the LED group 17G are collectively positioned in the cutout 14e. The cutout 14e is in the ineffective light output area NAA, which is the outer peripheral portion of the light guide plate 14, and is not located in the effective light output area AA. Portions of the outer peripheral surface of the light guide plate 14 that do not include the light entrance surfaces 14a are the non-light entrance surfaces 14a each having an arc-like shape.

The light guide plate 14 is divided into a plurality of fan-shaped areas (sector areas) SA as described below based on the above-described arrangement of the LEDs 17. Specifically, as illustrated in FIG. 2, the light guide plate 14 is divided into as many fan-shaped areas SA as the LED groups 17G by segment lines SL extending through the center C thereof. All the segment lines SL meet at the center C of the light guide plate 14. Specifically, the segment line SL defining the fan-shaped areas SA adjacent to each other in the circumferential direction coincides with the middle between the LEDs 17 each located close to the segment line SL in the circumferential direction (located at the end) in the respective sets of two LEDs 17 constituting the LED groups 17G. Thus, the LEDs 17 adjacent to each other with the segment line SL therebetween in the circumferential direction are line-symmetrically positioned with respect to the segment line SL (a distance from the segment line SL is equal). As described above, the arrangement of the fan-shaped areas SA of the light guide plate 14 corresponds to the arrangement of the LED groups 17G on the LED board 18 in the circumferential direction, and the set of the two LEDs 17 constituting the LED group 17G is provided for each of the fan-shape areas SA. Furthermore, the central position of each fan-shaped area SA in the circumferential direction, coincides with the middle between two LEDs 17 at the ends in the respective LED groups 17G (see FIG. 5). In the light guide plate 14, the fan-shaped areas SA have the same central angle. The central angle is "360/n" where "n" is the number of fan-shaped areas SA. Specifically, the central angle of the fan-shaped area SA is about 51.43 degrees, which is equal to the central angle between the LED groups 17G adjacent to each other in the circumferential direction. In addition, since the specific number of fan-shaped areas SA is seven, i.e., an odd number of three or more, all the segment lines SL defining the fan-shaped areas SA meet at the center C of the light guide plate 14. In this configuration, when the light is applied to the fan-shaped areas SA from the sets of two LEDs 17, which constitute the LED groups 17G provided for the fan-shaped areas SA, the light travels over the center C of the light guide plate 14 to positions close to the segment lines SL, i.e., the borders between the fan-shaped areas SA adjacent to each other in the circumferential direction. In general, the amount of light inside the guide plate 14 is likely to be insufficient at the position near the border between the fan-shaped areas SA adjacent to each other in the circumferential direction, but the above-described configuration reduces unevenness in the amount of light in the plate surface of the light guide plate 14.

As illustrated in FIG. 6, the LED board 18 includes as many wiring portions 18c as the LEDs 17 constituting the LED group 17G provided for the fan-shaped area SA, i.e., two wiring portions 18c. In other words, the LED board 18 has two electric power distribution systems. Specifically, the wiring portion 18c includes a first wiring portion 18cA (a first power supply wiring portion, a first power supply portion) connected to one of the two LEDs 17 constituting the LED group 17G and a second wiring portion (a second power supply wiring portion, a second power supply portion) 18cB connected to the other LED 17. One of the LEDs 17 connected to the first wiring portion 18cA is referred to as a first LED 17A and the other of the LEDs 17 connected to the second wiring portion 18cB is referred to as a second LED 17B. Hereinafter, when the wiring portions 18c and the LEDs 17 need to be distinguished, a letter A is added to the reference numeral of each of the first wiring portion and the first LED and a letter B is added to the reference numeral of each of the second wiring portion and the second LED, and when they do not need to be distinguished and are collectively referred, no letter is added.

Figure 7:
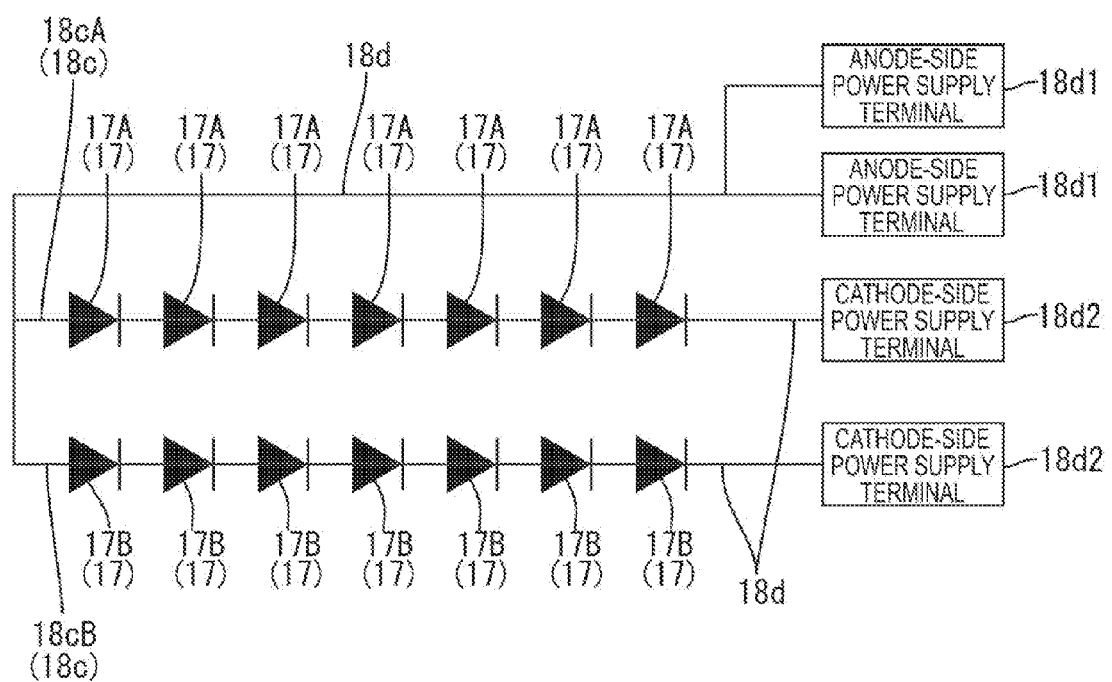
FIG. 7 is a circuit diagram illustrating a circuit configuration of the LED board.

Specifically, as illustrated in FIG. 6, the first wiring portion 18cA extends almost all the way round the board body 18a on the inner circumferential side of the LEDs 17 on the board body 18a of the LED board 18, and the second wiring portion 18cB extends almost all the way round the board body 18a on the outer circumferential side of the LEDs 17. The first and second wiring portions 18cA and 18cB each have ends on the extended portion 18b. The first wiring portion 18cA located on the inner circumferential side of the LEDs 17 is connected to terminals of the LEDs 17 located at the front side in the counterclockwise direction in the respective LED groups 17G including the two LEDs 17. In other words, each of the first LEDs 17A connected to the first wiring portion 18cA is one located at the front side in the counterclockwise direction of the two LEDs 17 constituting the LED group 17G, and all the first LEDs 17A form the same central angle of about 51.43 degrees therebetween. In contrast, the second wiring portion 18cB located on the outer circumferential side of the LEDs 17 is connected to terminals of the LEDs 17 located at the rear side in the counterclockwise direction in the respective LED groups 17G including the two LEDs 17. In other words, each of the second LEDs 17B connected to the second wiring portion 18cB is one located at the rear side in the counterclockwise direction of the two LEDs 17 constituting the LED group 17G, and all the second LEDs 17B form the same central angle of about 51.43 degrees therebetween, which is equal to the central angle between the first LEDs 17. Thus, the first LEDs 17A and the second LEDs 17B are alternatively arranged in the circumferential direction on the LED board 18. As illustrated in FIG. 6 and FIG. 7, the first wiring portion 18cA and the second wiring portion 18cB are collectively connected at one end to the extended wiring portion 18d continuously extending to the anode-side power supply terminals 18d1 and are separately connected at the other end to the extended wiring portions 18d continuously extending to the cathode-side power supply terminals 18d2. This configuration enables the first LEDs 17A to be driven in series by the first wiring portion 18cA and the second LEDs 17B to be driven in series by the second wiring portion 18cB.

In this configuration, the electric power is separately supplied to the first LED 17A and the second LED 17B, which constitute the LED group 17G provided for the fan-shaped area SA, by the first wiring portion 18cA and the second wiring portion 18cB, respectively. For example, one of the two LEDs 17 constituting the LED group 17G provided for the fan-shaped area SA may become inoperative by any chance due to a malfunction of one of the two LEDs 17 of the LED group 17G provided for the fan-shaped area SA or breaking of one of the two wiring portions 18c. In such a case, the electric power is kept supplied to the other of the LEDs 17 through the other of the wiring portions 18c. In other words, when any one of the LEDs 17 become inoperative, the other of the LEDs 17 constituting the LED group 17G including the inoperative LED 17 is operative since the electric power is kept supplied thereto. Thus, it will not happen that all the LEDs 17 constituting the same LED group 17G become inoperative, and the operative LED 17 keeps applying the light to the fan-shaped area SA corresponding to the LED group 17G. Therefore, the inoperative LED 17, which may be included in the two LEDs 17 constituting the LED group 17G, is unlikely to generate a local dark portion. In addition, the first LEDs 17A adjacent to each other in the circumferential direction form the same central angle therebetween and the second LEDs 17B adjacent to each other in the circumferential direction form the same central angle therebetween. One of the first wiring portion 18cA and the second wiring portion 18cB may be broken and all the LEDs 17 connected to the broken wiring portion 18c may become inoperative by any chance. In such a case, the LEDs 17 connected to the other wiring portion 18c, which are arranged with an equal angular space therebetween, are operative. Thus, the light from the operative LEDs 17 enters the light guide plate 14 with an equal distance in the circumferential direction, and the output light from the light output surface 14b of the light guide plate 14 is unlikely to have uneven brightness on the plate surface thereof.

The present embodiment has the above-described structure. Next, the operation thereof is described. When the liquid crystal display device 10 is powered on, various signals relating to a display outputted from a control board, which is not illustrated, is transmitted to the liquid crystal panel 11 through the flexible board 20, and thus the drive of the liquid crystal panel 11 is controlled and the LEDs 17 on the LED board 18 is controlled by an LED drive circuit board, which is not illustrated. As illustrated in FIG. 2 and FIG. 4, the light emitted by the LEDs 17, which are arranged to surround the light guide plate 14 with a distance therebetween in the circumferential direction, is applied to the light entrance surfaces 14a of the light guide plate 14 and then travels in the light guide plate 14 and exits through the light output surface 14b. The light that has exited through the light output surface 14b is provided with predetermined optical properties when passing through the optical sheets 15 and then applied to the liquid crystal panel 11. Thus, the light is used for a display of an image.

Specifically, as illustrated in FIG. 2, FIG. 6, and FIG. 7, the first LEDs 17A of the LEDs 17 on the LED board 18 are driven in series by the electric power from the first wiring portion 18cA connected thereto, and the second LEDs 17B are driven in series by the electric power from the second wiring portion 18cB connected thereto. Thus, the first LEDs 17A and the second LEDs 17B constituting the LED groups 17G are lit, and the light from the first and second LEDs 17A and 17B is applied to the common light entrance surface 14a, supplying the light to the fan-shaped area SA corresponding to the LED group 17G. Since the light entrance surfaces 14a are parallel to the light-emitting surfaces 17a of the LEDs 17, the light from the LEDs 17 is applied to the light entrance surfaces 14a with high entrance efficiency. In addition, since the middle between the two LEDs 17 constituting the LED group 17G coincides with the central position of the fan-shaped area SA in the circumferential direction, the light from the LEDs 17 travels in the fan-shaped area SA while reliably spreading from the central side toward each end in the circumferential direction. In this configuration, the amount of output light from the light guide plate 14 is readily equalized in the fan-shaped areas SA, reliably reducing the uneven brightness.

Here, for example, any one of the first LEDs 17A connected to the first wiring portion 18cA may become inoperative due to a short circuit, for example, or all the first LEDs 17A may become inoperative due to breaking of the first wiring portion 18cA at some point. In such a case, as illustrated in FIG. 2, FIG. 6, and FIG. 7, the second LEDs 17B connected to the second wiring portion 18cB remain operative since the electric power is kept supplied thereto. At least the light from the second LEDs 17B is supplied to the fan-shaped areas SA. Meanwhile, any one of the second LEDs 17B connected to the second wiring portion 18cB may become inoperative due to a short circuit, for example, or all the second LEDs 17B may become inoperative due to breaking of the second wiring portion 18cB at some point. In such a case, the first LEDs 17A connected to the first wiring portion 18cA are operative since the electric power is kept supplied thereto. At least the light from the first LEDs 17A is applied to the fan-shaped areas SA. Thus, the application of light to the fan-shaped areas SA does not stop, and thus the plate surface of the light guide plate 14 is unlikely to have a local dark portion, reducing the uneven brightness in the output light from the backlight device 12. Other than the breaking of the wiring portion 18c, one faulty LED 17 may make all the other LEDs 17 connected to the wiring portion 18c to which the faulty LED 17 is connected inoperative. In such a case, the same as the above is applicable.

In addition, as illustrated in FIG. 2, since the fan-shaped areas SA have the same central angle, the amount of output light is readily equalized in the fan-shaped areas SA, reliably reducing the uneven brightness. In addition, since the same number (two) of LEDs 17 constitutes each of the LED groups 17G provided for the fan-shaped areas SA, the amount of output light from the light guide plate 14 is readily equalized in the fan-shaped areas SA by equalization of the electric power supplied to the LEDs 17 through the wiring portions 18c. This simplifies the structure relating to the power supply (a power circuit, for example). Furthermore, in case of breaking of one of the wiring portions 18c, since the central angles in the fan-shaped areas SA between the LEDs 17 connected to the same wiring portion 18c are the same, the operative LEDs 17 connected to the other wiring portion 18c are arranged with an equal angular space therebetween. Thus, the light from the operative LEDs 17 enters the light guide plate 14 at positions with an equal distance therebetween in the circumferential direction, and the output light through the light output surface 14b of the light guide plate 14 is unlikely to have the uneven brightness on the plate surface. In addition, since the distance between the two LEDs 17 constituting the LED group 17G is smaller than the distance between the LEDs 17 each located close to the segment line SL in the respective sets of two LEDs 17 provided for the fan-shaped areas SA adjacent to each other in the circumferential direction, when one of the two LEDs 17 in the LED group 17G become inoperative, the other operative LED 17 is located close to the inoperative LED 17. This allows the operative LED 17 to supplement the operation of the inoperative LED 17 and exhibit approximate optical properties, and thus the a local dark portion is unlikely to be generated in the fan-shaped area SA.

As described above, the backlight device (lighting device) 12 according to this embodiment includes the light guide plate 14, the plurality of LEDs (light sources) 17, and the plurality of wiring portions (power supply portions) 18c. The light guide plate 14 has a substantially circular outer shape and having the plurality of fan-shaped areas SA defined by the segment lines SL extending through the center C thereof. All the segment lines SL meet at the center C. The plurality of LEDs 17 are arranged next to each other in a circumferential direction of the light guide plate to surround the light guide plate 14. The plurality of LEDs 17 include sets of multiple LEDs 17 provided for the plurality of fan-shaped areas SA. The plurality of LEDs 17 are arranged such that middle positions between the LEDs 17 each located at an end in the circumferential direction in the respective sets of the multiple LEDs 17 provided for the plurality of fan-shaped areas SA adjacent to each other in the circumferential direction coincides with the segment lines SL. The plurality of wiring portions 18c are equal or larger in number than the multiple LEDs 17 in each of the sets of multiple LEDs 17 provided for the plurality of fan-shaped areas SA. The plurality of wiring portions are configured to supply electric power to the respective multiple LEDs 17 provided for the plurality of fan-shaped areas SA.

In this configuration, the light guide plate 14 having a substantially circular outer shape allows light from the LEDs 17, which are arranged next to each other in the circumferential direction, to enter thereinto, and guides the light therethrough and then outputs the light therefrom. The fan-shaped areas SA are defined by the segment lines SL located at the middle positions between the LEDs 17 each located at the end in the circumferential direction in the respective sets of the multiple of LEDs 17 provided for the fan-shaped areas SA adjacent to each other in the circumferential direction and all the segment lines SL meet at the center of the light guide plate 14. Thus, when the light is applied to the fan-shaped areas SA from the sets of the multiple LEDs 17 provided for the fan-shaped areas SA, the light travels over the center C of the light guide plate 14 to positions close to the segment lines SL, i.e., the border between the fan-shaped areas SA adjacent to each other in the circumferential direction. In general, the amount of light inside the light guide plate 14 is likely to insufficient at the position near the border between the fan-shaped areas SA adjacent to each other, but the above-described configuration reduces the unevenness in amount of light in the plate surface of the light guide plate 14.

In addition, the wiring portions 18c, which are equal or larger in number than the multiple LEDs 17 provided for each of the fan-shaped areas SA, supply power to each of the multiple LEDs 17 provided for each of the fan-shaped areas SA. If any one of the multiple LEDs 17 provided for the fan-shaped area SA becomes inoperative due to a malfunction of any one of the multiple LEDs 17 provided for the fan-shaped area SA or breaking of any one of the wiring portions 18*c*, for example, power is kept supplied to the other LEDs 17 by the other wiring portion 18*c*. Thus, a local darkness portion is unlikely to be generated by the inoperative LED 17.

In addition, the plurality of fan-shaped areas SA of the light guide plate 14 have the same central angle and the number of fan-shaped areas SA is an odd number of three or more. In this configuration, the amount of output light from the light guide plate 14 is readily equalized in the fan-shaped areas SA, compared with a configuration including a plurality of fan-shaped areas having different central angles, reliably reducing the uneven brightness.

In addition, the same number of the multiple LEDs 17 is included in each of the sets of multiple LEDs 17 provided for the plurality of fan-shaped areas SA. In this configuration, the amount of output light from the light guide plate 14 is readily equalized in the fan-shaped areas SA by equalization of power supplied to the multiple LEDs 17 provided for each of the fan-shaped areas SA. This simplifies the structure of the wiring portion 18*c*.

In addition, the plurality of LEDs 17 are arranged such that the LEDs 17 connected to the same one of the wiring portions 18*c* form the same central angle in each of the plurality of fan-shaped areas SA. If any one of the wiring portions 18*c* is broken, all the LEDs 17 connected to the broken wiring portion 18*c* may be inoperative. In such a case, since the LEDs 17 in this embodiment are arranged such that the LEDs 17 connected to the same wiring portion 18*c* form the same central angle in the fan-shaped areas SA, the remaining operative LEDs 17 are arranged with an equal angular space therebetween. This configuration enables power to be supplied to the remaining operative LEDs 17 through the other wiring portion 18*c* when all the LEDs 17 connected to the broken wiring portion 18*c* are inoperative, reducing the possibility that the output light from the light guide plate 14 will have uneven brightness in the plate surface thereof.

In addition, the plurality of LEDs 17 are arranged such that the distance between the multiple LEDs 17 in each of the sets of multiple LEDs 17 provided for the fan-shaped areas SA is smaller than the distance between the LEDs 17 each located at the end in the circumferential direction in the respective sets of the multiple LEDs 17 provided for the fan-shaped areas SA adjacent to each other in the circumferential direction. In this configuration, when any one of the multiple LEDs 17 provided for the fan-shaped area SA becomes inoperative, the remaining operative LED 17 is located closer to the inoperative LED 17 than to the LED 17 at the end in the circumferential direction of the multiple LEDs 17 provided for the adjacent fan-shaped area SA. This configuration enables the operative LED 17 to supplement the operation of the inoperative LED 17 and exhibit approximate optical properties, and thus a local darkness portion is unlikely to be generated by the inoperative LED 17.

In addition, the plurality of LEDs 17 are arranged such that the central position between the LEDs 17 located at the ends in the circumferential direction in each of the sets of the multiple LEDs 17 provided for the fan-shaped areas SA coincides with the central position in the circumferential direction of each of the fan-shaped areas SA. In this configuration, when the light emitted by the multiple LEDs 17 provided for the fan-shaped area SA enters the light guide plate 14, the light travels in the fan-shaped area SA while reliably spreading from the central side toward each end in the circumferential direction. In this configuration, the amount of output light from the light guide plate 14 is readily equalized in the fan-shaped areas SA, reliably reducing uneven brightness.

In addition, the light guide plate 14 has the plurality of light entrance surfaces 14*a* included for each of the fan-shaped areas SA in the outer peripheral surface. The light entrance surfaces 14*a* are arranged parallel to the light-emitting surfaces 17*a* of the LEDs 17 such that the light from the LEDs 17 is applied to the light entrance surfaces 14*a*. Since the light entrance surfaces 14*a* of the light guide plate 14 is parallel to the light-emitting surfaces 17*a* of the LEDs 17, the light from the LEDs 17 is applied to the light entrance surfaces 14 with high light entrance efficiency.

In addition, the light guide plate 14 includes the cutouts 14*e* having the light entrance surface 14*a*. The cutouts 14*e* are obtained by cutting out the outer peripheral portion at positions away from each other in the circumferential direction, and the plurality of LEDs 17 each nave at least a portion positioned in one of the cutouts 14*e*. This configuration, in which the at least a portion of each of the LEDs 17 is positioned in the cutout 14*e*, reduces the frame size of the backlight device 12 compared with a configuration in which a light guide plate has protrusions protruding outwardly from the outer peripheral portion at positions away from each other in the circumferential direction and each protrusion has the light entrance surface 14*a*.

In addition, each of the cutouts 14*e* in the light guide plate 14 has two or more of the plurality of light entrance surfaces 14*a* and allows the at least a portion of each of the multiple LEDs 17 provided for the fan-shaped areas SA to be collectively positioned therein. The number of cutouts 14*e* is equal to the number of plurality of fan-shaped areas SA. In this configuration, the outer shape of the light guide plate 14 is unlikely to be complex compared to the configuration in which the cutout 14*e* is provided for each of the multiple LEDs 17 provided for the fan-shaped area SA. Furthermore, the light from the multiple LEDs 17 each having a portion collectively positioned in the cutout 14*e* is applied to the light entrance surfaces 14*a* of the cutout 14*e* and travels through the light guide plate 14.

In addition, the central position of the light guide plate 14 includes the effective light output area AA through which the light effectively exits and the outer peripheral portion of the light guide plate includes the ineffective light output area AA surrounding the effective light output area AA and having the cutouts 14*e*. In this configuration, since the cutout 14*e* is provided in the ineffective light output area NAA of the light guide plate 14 surrounding the effective light output area AA and the cutout 14*e* is not provided in the effective light output area AA through which the light effectively exits, the cutout 14*e* is unlikely to affect the output light from the effective light output area AA, reliably reducing the uneven brightness.

In addition, the LED board (a light source board) 18 is provided on which the plurality of LEDs 17 are mounted. The light source board 18 includes the plurality of wiring portions (power supply wiring portions) 18*c* constituting the plurality of power supply portions. The plurality of wiring portions are connected to the respective LEDs 17 in each of the sets of the multiple LEDs 17 provided for each of the fan-shaped areas SA. In this configuration, compared with a configuration in which a wiring portion is a separate component from the LED board 18, the number of components and the number of assembling steps are small, reliably reducing the cost.

In addition, the liquid crystal display device (a display device) 10 according to the present embodiment includes the above-described backlight device 12, and a liquid crystal panel (a display panel) 11 configured to provide a display by using light from the backlight device 12. Since the backlight device 12 configured to supply light to the liquid crystal panel 11 is unlikely to generate uneven brightness, the liquid crystal display device 10 having the above-described configuration is able to display an image with high display quality.

Second Embodiment

A second embodiment of the invention is described with reference to FIG. 8 or FIG. 9. In the second embodiment, the arrangement of LEDs 117 are in a different arrangement and the shape of cutouts 114e in a light guide plate 114 are different. The configurations, operations, and effects similar to those in the first embodiment are not described.

Figure 8:
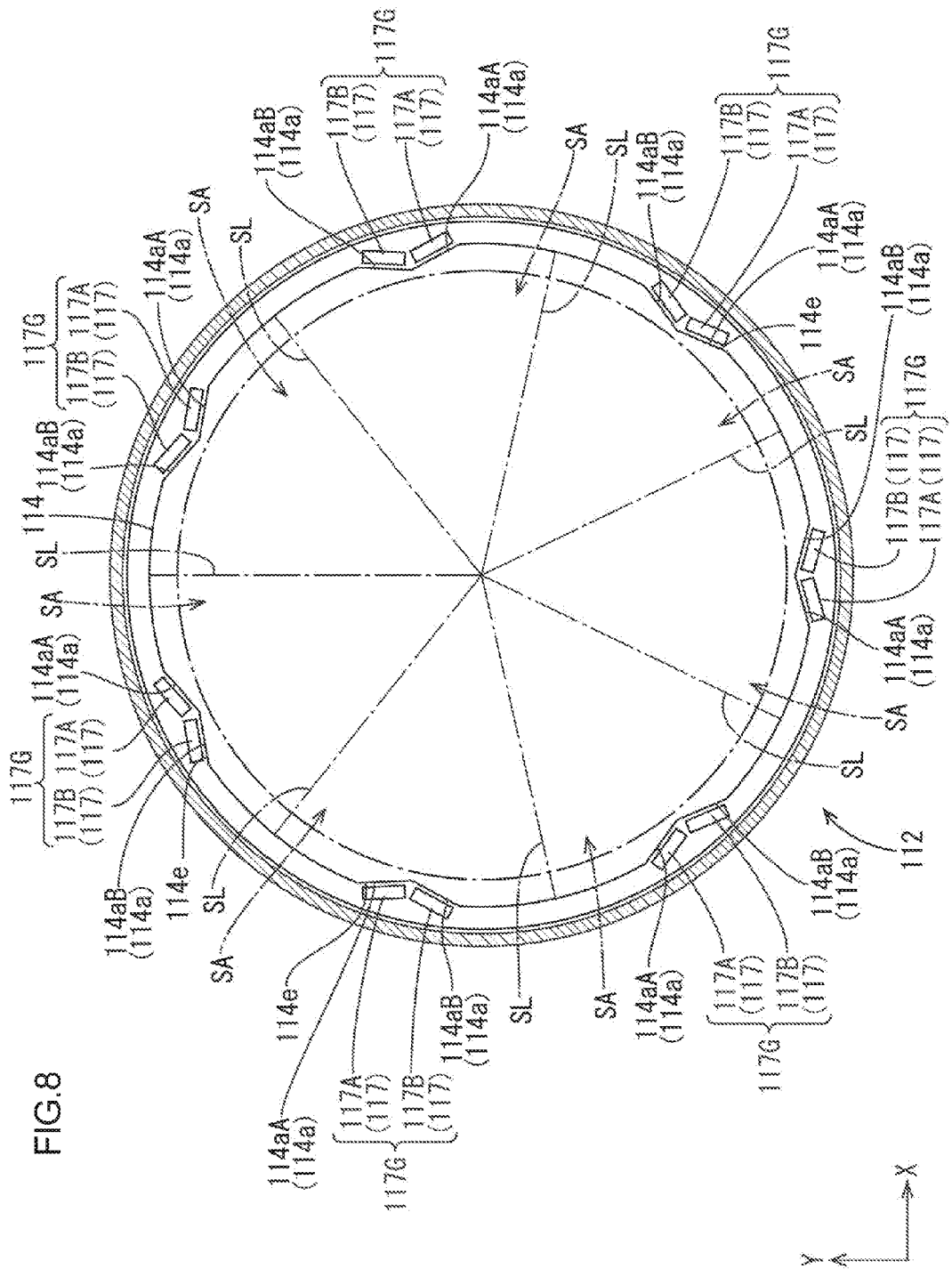
FIG. 8 is a plan view illustrating a backlight device according to a second embodiment of the invention.

As illustrated in FIG. 8, two LEDs 117 constituting an LED group 117G according to this embodiment are arranged such that light-emitting surfaces 117a thereof are tilted with respect to each other. Specifically, the light-emitting surfaces 117a of the two LEDs 117 constituting the LED group 117G form an angle larger than 180 degrees, i.e., a major angle. As illustrated in FIG. 9, a first LED 117A of the two LEDs 117 has a light-emitting surface 117a facing a segment line SL between the fan-shaped areas SA adjacent to each other in the clockwise direction (side away from a second LED 117B adjacent to the first LED 117A in the circumferential direction) and has an optical axis intersecting the segment line SL. In contrast, the second LED 117B has a light-emitting surface 117a facing a segment line SL between the fan-shaped areas SA adjacent to each other in the counterclockwise direction (side away from the first LED 117A adjacent to the second LED 117B in the circumferential direction) and has an optical axis intersecting the segment line SL. This configuration allows a larger amount of the light that has been applied to the light entrance surface 114a from the light-emitting surfaces 117a of the LEDs 117, which constitute the LED group 117G provided for the fan-shaped area SA, to travel toward a portion between the LED groups 117G provided for the adjacent fan-shaped areas SA, and thus the portion is unlikely to have a dark portion. In other words, the output angle range of the light emitted by the LED group 117G is wider than that in the above-described first embodiment, and thus the light that has entered the light guide plate 114 travels in the fan-shaped area SA while spreading wider in the circumferential direction, reliably reducing the uneven brightness. In FIG. 9, the output angle range of the light from the LED 117 is indicated by one-dot chain lines.

Figure 9:
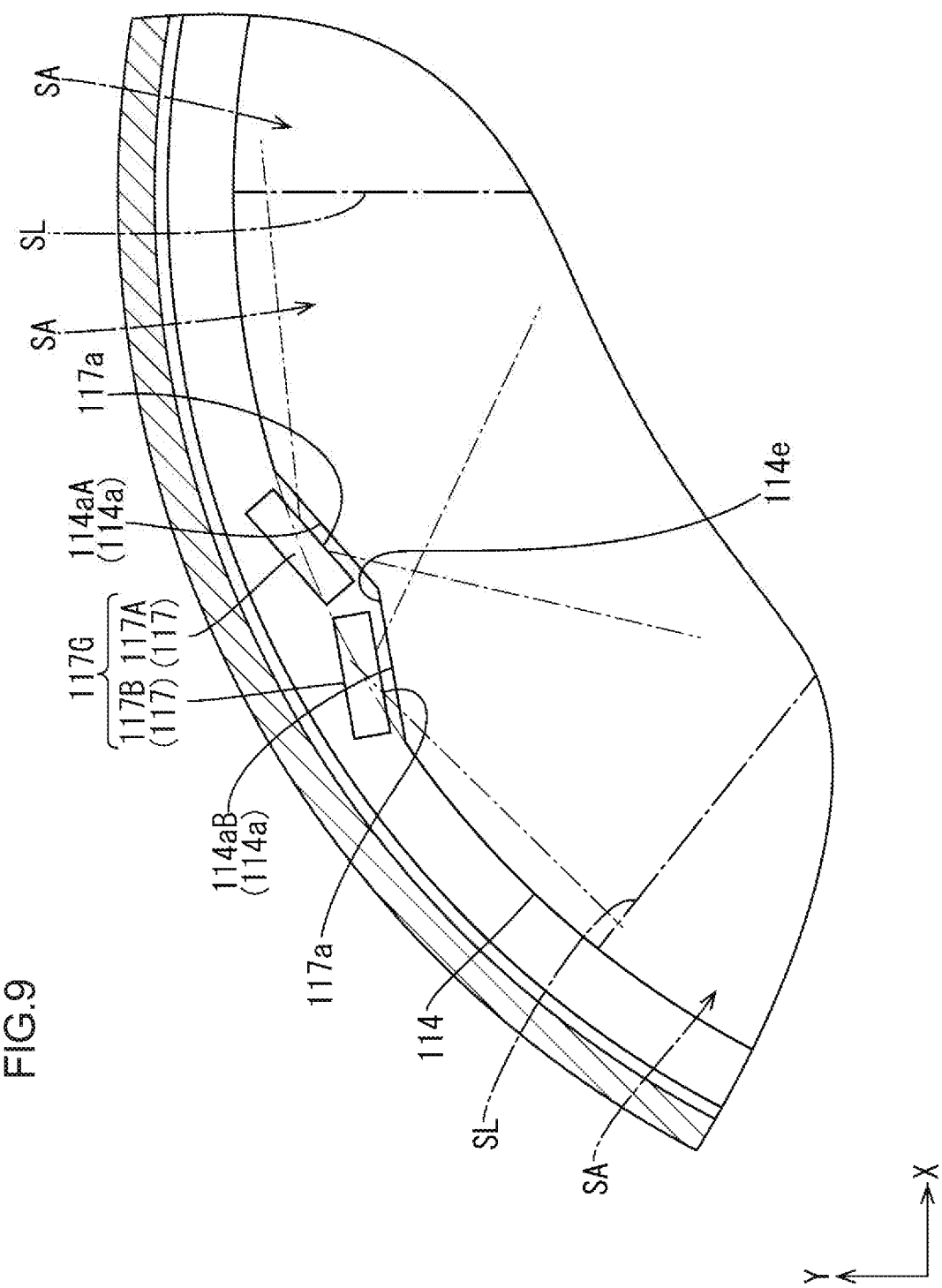
FIG. 9 is a magnified plan view of the backlight device.

As illustrated in FIG. 9, the cutout 114e in the outer peripheral portion of the light guide plate 114 has a substantially V shape in plan view, and the cutout depth is the deepest at the central position. The formation range of the cutout 114e is narrower in the circumferential direction, but wider (deeper) in the radial direction, than that in the above-described first embodiment. A portion of each of the two LEDs 117 constituting the LED group 117G is positioned in the cutout 114e, and the portion is in the cutout 114e over a larger area than that in the first embodiment. This further reduces the frame width compared with the above-described first embodiment. The cutout 114e provides two light entrance surfaces 114a, which are connected to each other at an angle, in the outer peripheral surface of the light guide plate 114. The two light entrance surfaces 114a are symmetrical. The two light entrance surfaces 114a form an angle smaller than 180 degrees, i.e., a minor angle. The sum of such an angle and the angle between the light-emitting surfaces 117a of the two LEDs 117 constituting the LED group 117G is 360 degrees, i.e., a full angle. Therefore, the two light entrance surfaces 114a include one (a first light entrance surface 114aA) parallel to the light-emitting surface 117a of the first LED 117A and one (a second light entrance surface 114aB) parallel to the light-emitting surface 117a of the second LED 117B. The first light entrance surface 114aA parallel to the light-emitting surface 117a of the first LED 117A would come in contact with the light-emitting surface 117a of the first LED 117A if the light guide plate 114 turns in a clockwise direction. The second light entrance surface 114aB parallel to the light-emitting surface 117a of the second LED 117B would come in contact with the light-emitting surface 117a of the second LED 117B if the light guide plate 114 turns in the counterclockwise direction. This limits the displacement of the substantially circular light guide plate 114 in the circumferential direction.

As described above, in this embodiment, the plurality of LEDs 117 are arranged such that the sets of the LEDs 117 provided for the plurality of fan-shaped areas SA each include the LED 117 having the light-emitting surface 117a tilted with respect to another LED 117. In this configuration, the light that has entered the light guide plate 114 from the LEDs 117 provided for each of the fan-shaped areas SA travels in the fan-shaped area SA while spreading wider in the circumferential direction. This reliably reduces the uneven brightness.

Furthermore, the plurality of LEDs 117 are arranged such that the multiple LEDs 117 provided for each of the fan-shaped areas SA include the LED 117 having the light-emitting surface 117a facing one side in the circumferential direction at one side in the circumferential direction and includes the LED 17 having the light-emitting surface 117a facing another side in the circumferential direction at another side in the circumferential direction. The light guide plate 114 has the cutouts 114e obtained by cutting out the outer peripheral portion of the light guide plate 114 at positions away from each other in the circumferential direction. The cutouts 114e has the plurality of light entrance surfaces 114a parallel to the light-emitting surfaces 117a of the multiple LEDs 117 provided for each of the fan-shaped areas SA. The light from the plurality of LEDs 117 is applied to the light entrance surfaces 114a. The cutouts 114e each allow at least a portion of each of the multiple LEDs 117 provided for the fan-shaped areas SA to be collectively positioned therein. The number of cutouts 114e is equal to the number of the fan-shaped areas SA. In this configuration, for example, LEDs 117 located at one side and another side in the circumferential direction of the LEDs 117 provided for the fan-shaped area SA would come in contact with the light entrance surfaces 114a of the cutout 114e at the light-emitting surfaces 117a if the light guide plate 114 turns. This limits the displacement of the light guide plate 114 in the circumferential direction. Furthermore, since at least a portion of each of the LEDs 117 provided for the fan-shaped areas SA is collectively positioned in the cutout 114e, the width of the frame of the backlight device 112 is reduced and the outer shape of the light guide plate 114 is unlikely to be complex.

Third Embodiment

A third embodiment of the invention is described with reference to FIG. 10 to FIG. 12. In the third embodiment, the number of LED groups 217G and the number of LEDs 217 constituting each LED group 217G differ from those in the above-described first embodiment. The configurations, operations, and effects similar to those in the first embodiment are not described.

Figure 10:
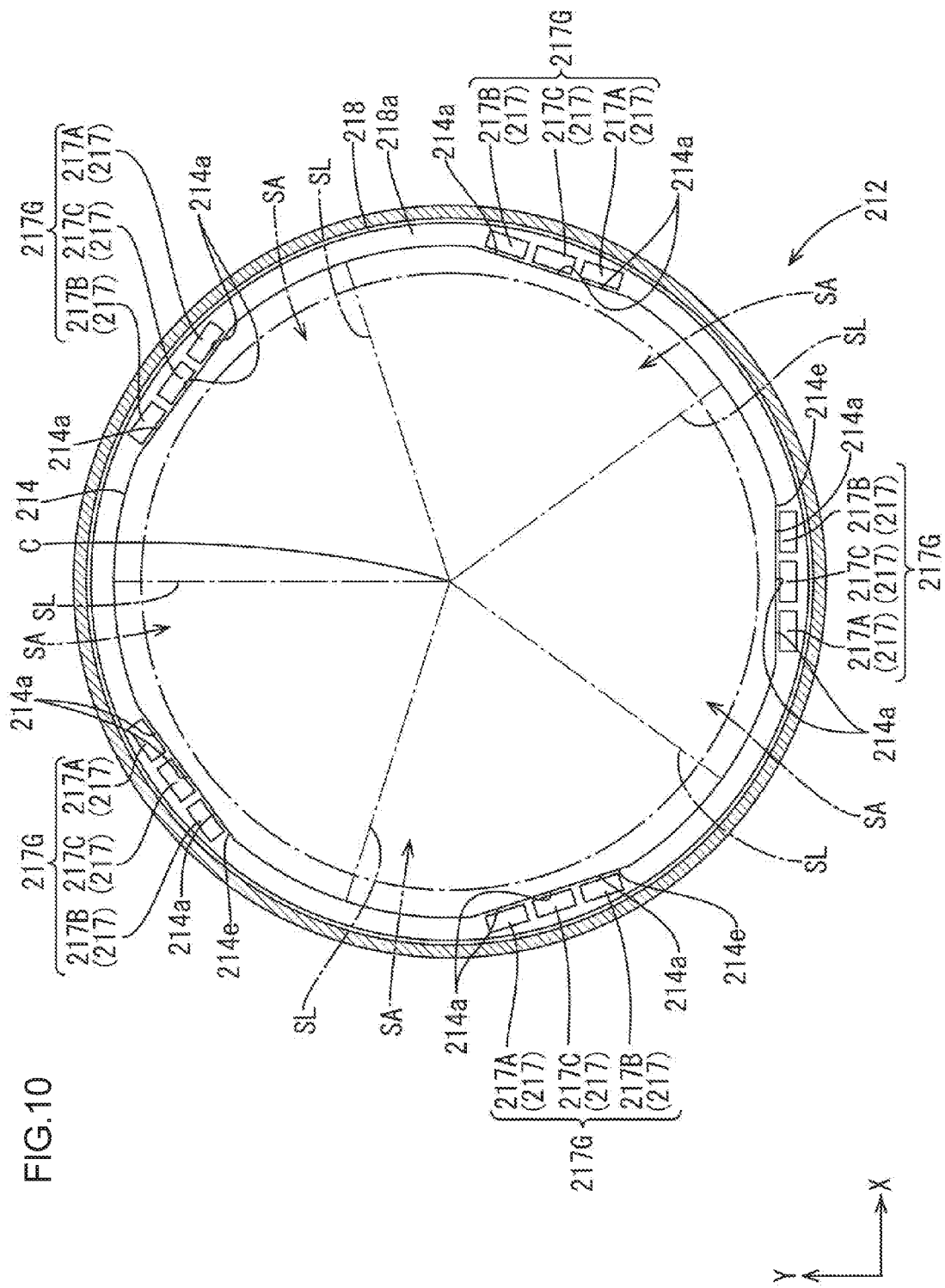
FIG. 10 is a plan view illustrating a backlight device according to a third embodiment of the invention.
Figure 11:
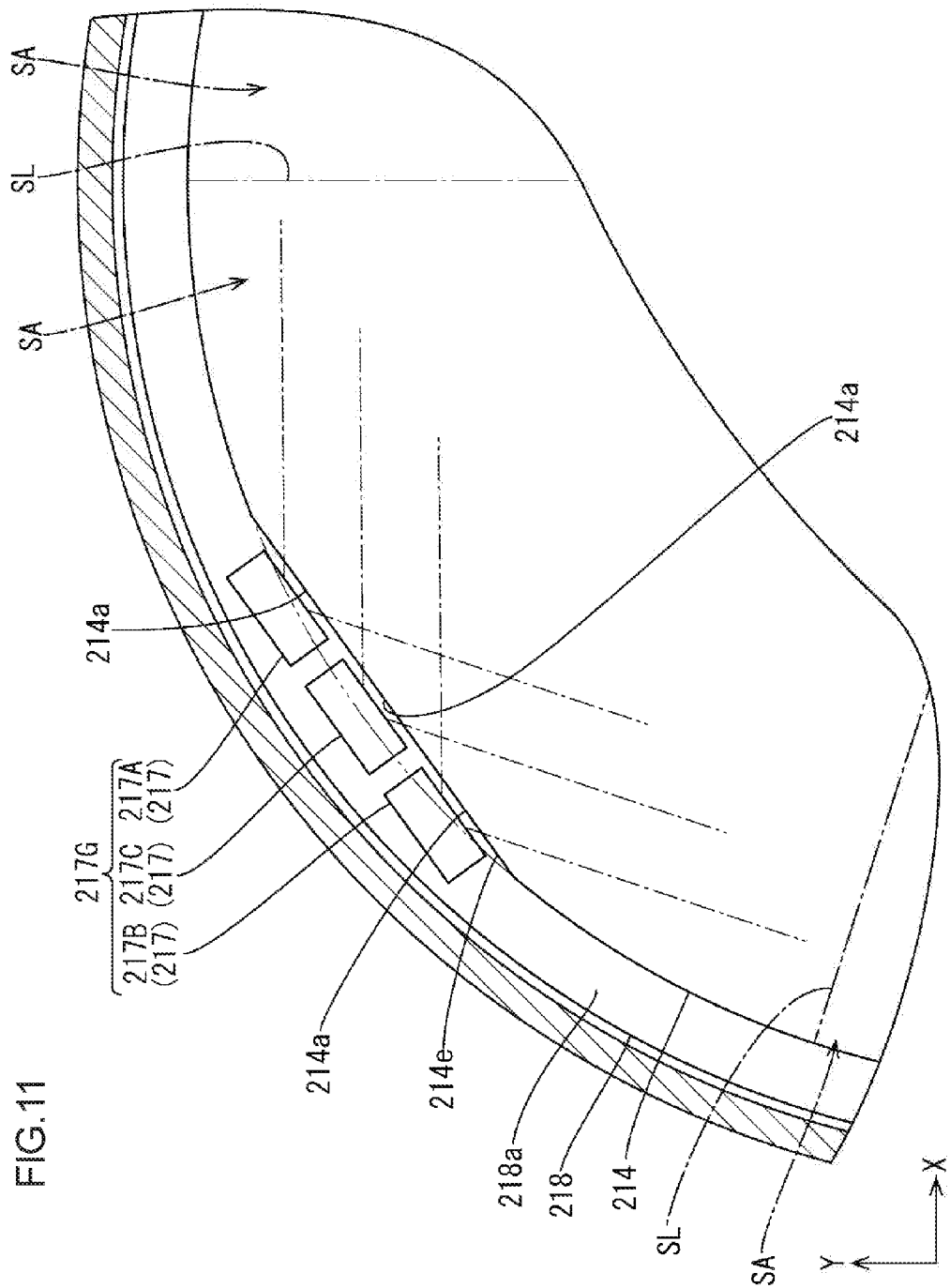
FIG. 11 is a magnified plan view of the backlight device.

As illustrated in FIG. 10, the number of LED groups 217G in this embodiment is five (an odd number larger than three), and each LED group 217G includes three LEDs 217. Specifically, the five LED groups 217G are arranged with an equal distance therebetween in the circumferential direction of the light guide plate 214, and the central angle between the LED groups 217G adjacent to each other in the circumferential direction is about 72 degrees. Thus, line segments each connecting the middle between two of the three LEDs 217 located at ends (the central position of the LED 217 at the center) in each of the LED groups 217G to the center C of the light guide plate 214 do not form a straight line with the center C of the light guide plate 214 therebetween and all the segment lines meet at the center C of the light guide plate 214. The distance between the three LEDs 217 constituting the LED group 217G adjacent to each other in the circumferential direction is smaller than the distance between the LED groups 217G adjacent to each other in the circumferential direction.

The light guide plate 214 is divided as follows according to the above-described arrangement of the LED groups 217G. As illustrated in FIG. 10, the light guide plate 214 is divided into as many fan-shaped areas SA as the LED groups 217G by the segment lines SL extending through the center C thereof, i.e., five fan-shaped areas SA, and all the segment lines SL meet at the center C of the light guide plate 214. Specifically, the segment line SL defining the fan-shaped areas SA adjacent to each other in the circumferential direction coincides with the middle between the LEDs 217 each located close to the segment line SL (located at one end) in the respective sets of the three LEDs 217 constituting the LED group 217G. Three LEDs 217 constituting each LED group 217G are provided for each of the fan-shaped areas SA. Furthermore, the central position of each fan-shaped area SA in the circumferential direction coincides with the middle between two of the LEDs 217 located at ends in each of the LED groups 217G (the central position of the LED 217 at the center) (see FIG. 11). The central angle of the fan-shaped area SA is about 72 degrees, which is equal to the central angle between the LED groups 217G adjacent to each other in the circumferential direction. In addition to this, the number of fan-shaped areas SA is five, i.e., an odd number larger than three, and thus all the segment lines SL defining the fan-shaped areas SA meet at the center C of the light guide plate 214. Three light entrance surfaces 214a to which light from the three LEDs 217 constituting the LED group 217G is applied are connected to each other to be an integral surface having an overall length extending over the three LEDs 217. The light from, all the three LEDs 217 constituting the LED group 217G is applied to the three light entrance surfaces 214a connected to each other. The formation range of a cutout 214e extends over the three LEDs 217 constituting the LED group 217G so as to form the light entrance surfaces 214a, and a portion of each of the three LEDs 217 constituting the LED group 217G is positioned in the cutout 214e. In FIG. 11, the output angle range of the light from the LED 217 is indicated by one-dot chain lines.

Figure 12:
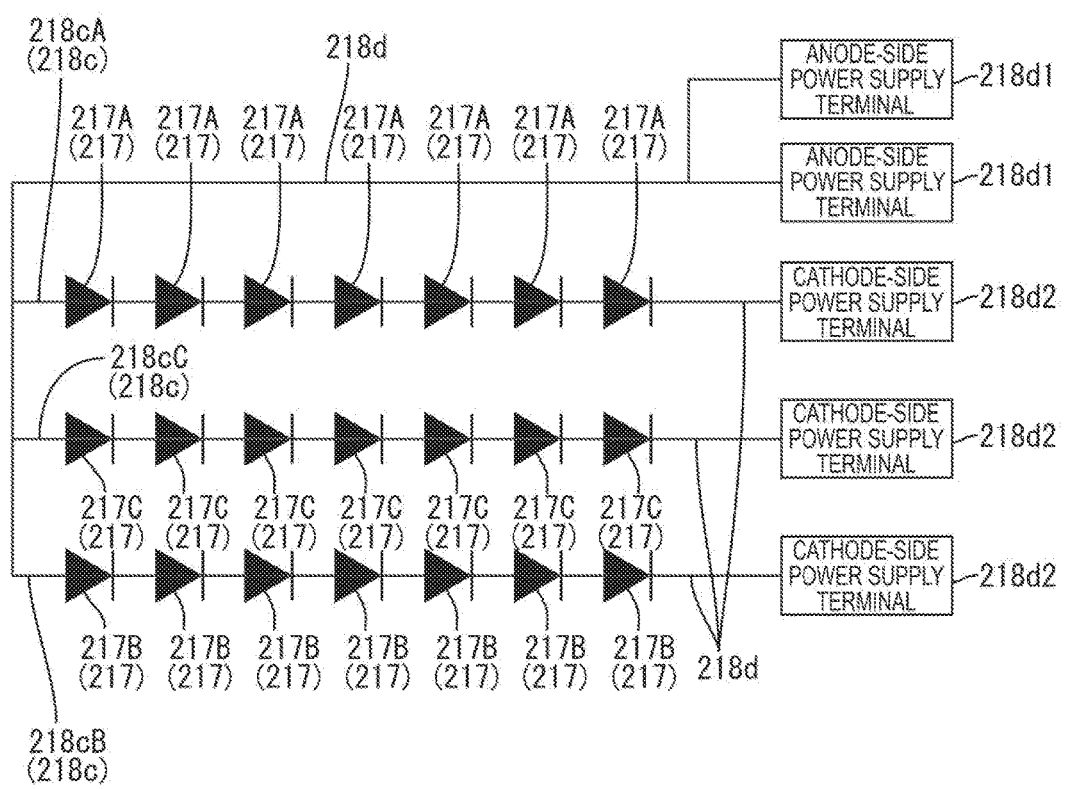
FIG. 12 is a circuit diagram illustrating a circuit configuration of an LED board.

As illustrated in FIG. 10 and FIG. 12, the LED board 218 includes as many wiring portions 218c as the LEDs 217 constituting the LED group 217G provided for the fan-shaped area SA, i.e., three wiring portions 218c. In other words, the LED board 218 has three power distribution systems. Specifically, the wiring portions 218c include a first wiring portion 218cA connected to one of the three LEDs 217 located at one end (end in the counterclockwise direction in FIG. 10) in the LED group 217G, a second wiring portion 218cB connected to one of the LEDs 217 located at the other end (end in the clockwise direction in FIG. 10), and a third wiring portion (third power supply wiring portion, third power supply) 218cC connected to one of the LEDs 217 located at the center. One of the LEDs 217 located at the one end and connected to the first wiring portion 218cA is referred to as a first LED 217A, one of the LEDs 217 located at the other end and connected to the second wiring portion 218cB is referred to as a second LED 217B, and one of the LEDs 217 located at the center and connected to the third wiring portion 218cC is referred to as a third LED 217C. Hereinafter, when the wiring portions 218c and the LEDs 217 need to be distinguished, a letter A is added to the reference numeral of each of the first wiring portion and the first LED, a letter B is added to the reference numeral of each of the second wiring portion and the second LED, and a letter C is added to the reference numeral of each of the third wiring portion and the third LED. The letter is not added to the reference numerals when they do not need to be distinguished.

Specifically, the first wiring portion 218cA, the second wiring portion 218cB, and the third wiring portion 218cC extend almost all the way round a board body 218a on the inner circumferential side or the outer circumferential side of the LEDs 217 on the board body 218a of the LED board 218, and are connected to the first LEDs 217A, the second LEDs 217B, and the third LEDs 217C, respectively, at the mid ways. The first wiring portion 218cA is connected to terminals of the LEDs 217 (the first LEDs 217A) each located at the front end in the counterclockwise direction in each of the sets of three LEDs 217 constituting the LED groups 217G. In other words, each one of the first LEDs 217A connected to the first wiring portion 218cA is one located at the front end in the counterclockwise direction in each of the sets of three LEDs 217 constituting the LED groups 217G, and all the first LEDs 217A form the same central angle of about 72 degrees therebetween. In contrast, the second wiring portion 218cB is connected to terminals of the LEDs 217 (the second LED 217B) each located at the rear end in the counterclockwise direction in each of the sets of the three LEDs 217 constituting the LED groups 217G. In other words, each one of the second LEDs 217B connected to the second wiring portion 218cB is one located at the rear end in the counterclockwise direction in each of the sets of the three LEDs 217 constituting the LED groups 217G, and all the second LEDs 217B form the same central angle of about 72 degrees therebetween, which is equal to the central angle between the first LEDs 217A. Furthermore, the third wiring portion 218cC is connected to terminals of the LEDs 217 (the third LED 217C) each located at the center in the circumferential direction in each of the sets of the three LEDs 217 constituting the LED groups 217G. In other words, each one of the third LEDs 217C connected to the third wiring portion 218cC is one located at the center in the circumferential direction in each of the sets of the three LEDs 217 constituting the LED groups 217G, and all the third LEDs 217C form the same central angle of about 72 degrees therebetween, which is equal to the central angle between the first LEDs 217A and the central angle between the second LEDs 217B. Thus, on the LED board 218, the first LEDs 217A, the second LEDs 217B, and the third LEDs 217C are alternately arranged in the circumferential direction. As illustrated in FIG. 12, the first wiring portion 218cA, the second wiring portion 218cB, and the third wiring portion 218cC are collectively connected at one end to an extended wiring portion 218d extending to anode-side power supply terminals 218d1 and separately connected at the other end to extended wiring portions 218d extending to cathode-side power supply terminals 218d2. This allows the first LEDs 217A, the second LEDs 217B, and the third LEDs 217C to be driven in series by the first wiring portion 218cA, the second wiring portion 218cB, and the third wiring portion 218cC, respectively.

In this configuration, for example, any one of the first LEDs 217A connected to the first wiring portion 218cA may become inoperative clue to a short circuit, or all the first LEDs 217A may become inoperative due to breaking of the first wiring portion 218cA at some point. In such a case, as illustrated in FIG. 12, the second LEDs 217B connected to the second wiring portion 218cB and the third LEDs 217C connected to the third wiring portion 218cC remain operative since the electric power is kept supplied thereto. At least the light from the second LEDs 217B and the third LEDs 218C is supplied to the fan-shaped areas SA. Meanwhile, any one of the second LEDs 217B connected to the second wiring portion 218cB may become inoperative due to a short circuit, for example, or all the second LEDs 217B may become inoperative due to breaking of the second wiring portion 218cB at some point. In such a case, the first LEDs 217A connected to the first wiring portion 218cA and the third LEDs 217C connected to the third wiring portion 218cC are operative since the electric power is kept supplied thereto. At least the light from the first LEDs 217A and the third LEDs 217C is applied to the fan-shaped areas SA. Furthermore, any one of the third LEDs 217C connected to the third wiring portion 218cC may become inoperative due to a short circuit, for example, or all the second LEDs 217B may become inoperative due to breaking of the third wiring portion 218cB at some point. In such a case, the first LEDs 217A connected to the first wiring portion 218cA and the second LEDs 217B connected to the second wiring portion 218cB are operative since the electric power is kept supplied thereto. At least the light from the first LEDs 217A and the second LEDs 217B is applied to the fan-shaped areas SA. Thus, the application of light to the fan-shaped areas SA does not stop, and thus the plate surface of the light guide plate 214 is unlikely to have a local dark portion, reducing the uneven brightness in the output light from the backlight device 212.

Fourth Embodiment

A fourth embodiment of the invention is described with reference to FIG. 13 or FIG. 14. In the fourth embodiment, the arrangement of LEDs 317 and the shape of cutouts 314e in a light guide plate 314 differ from those in the third embodiment. The configurations, operations, and effects similar to those in the third embodiment are not described.

Figure 13:
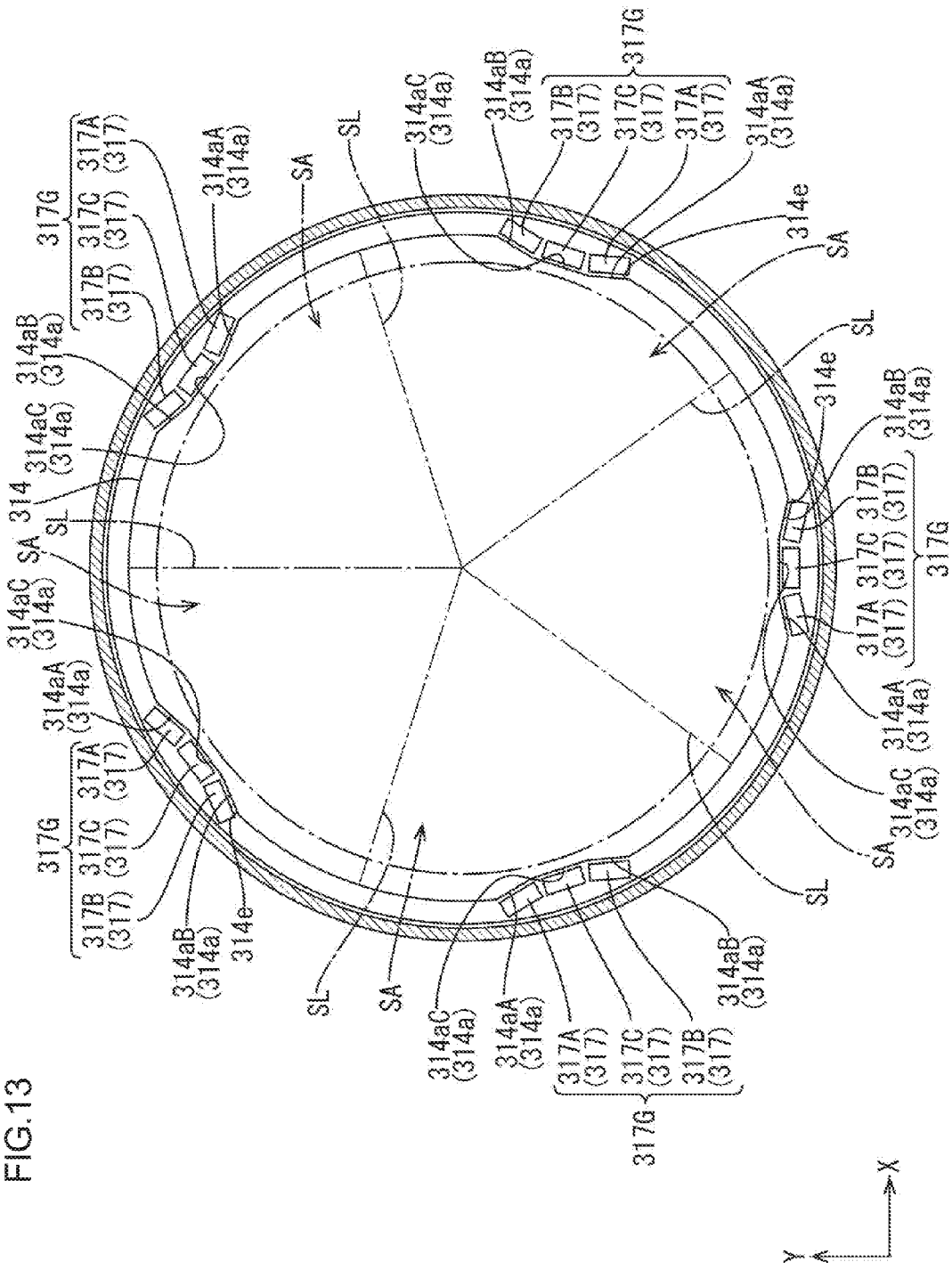
FIG. 13 is a plan view illustrating a backlight device according to a fourth embodiment of the invention.
Figure 14:
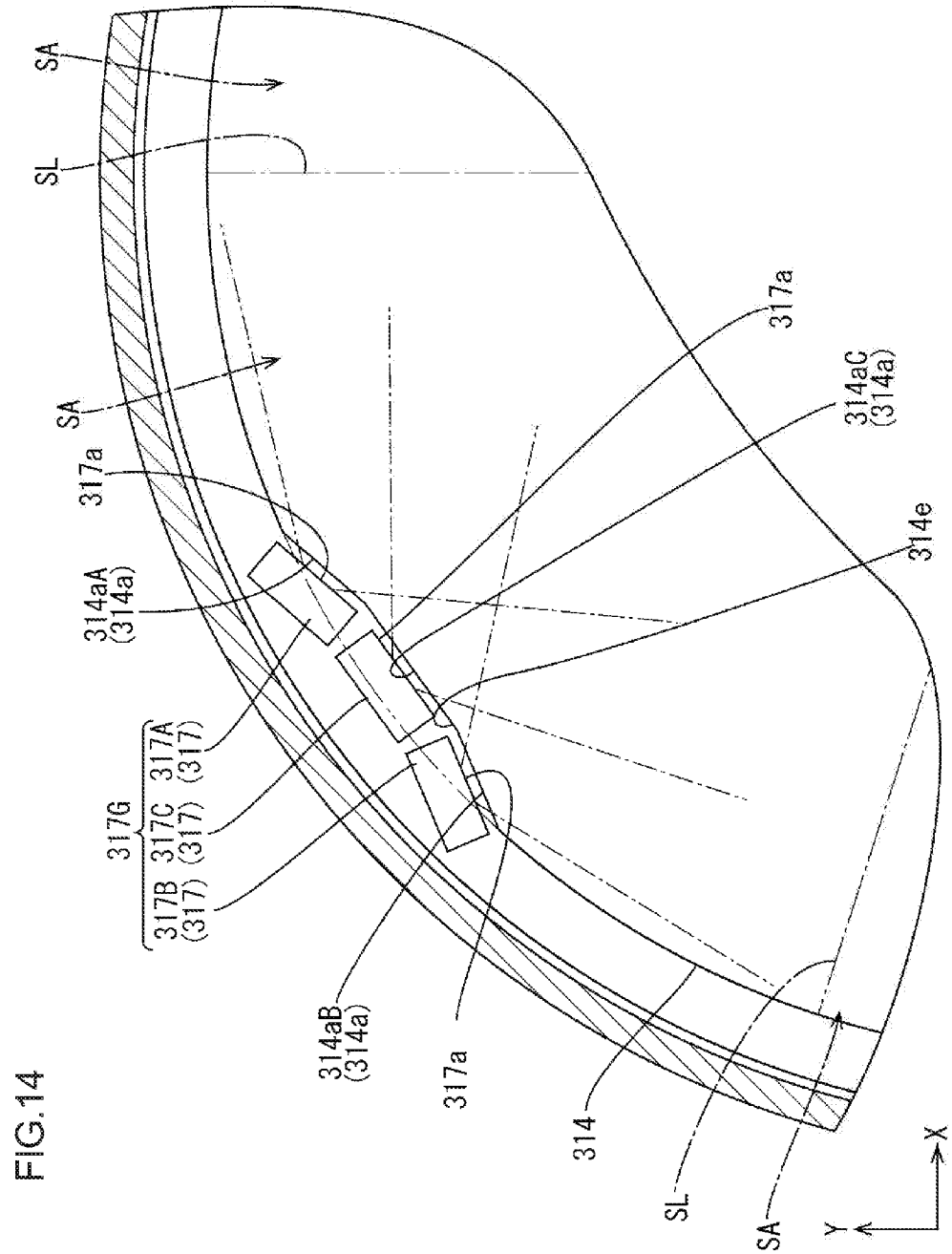
FIG. 14 is a magnified plan view of the backlight device.

As illustrated in FIG. 13 and FIG. 14, three LEDs 317 constituting an LED group 317G according to this embodiment are arranged such that light-emitting surfaces 317a thereof are tilted with respect to each other. Specifically, a third LED 317C, which is one located at the center in the circumferential direction in each set of the three LEDs 317 constituting the LED group 317G, has a light-emitting surface 317a parallel to a tangent line to the outer peripheral surface of the light guide plate 314, and a first LED 317A and a second LED 317B, which are located at the ends in the circumferential direction are arranged such that light-emitting surfaces 317a thereof are tilted with respect to the light-emitting surface 317a of the third LED 317C at an angle larger than 180 degrees, i.e., a major angle. Furthermore, the light-emitting surface 317a of the first LED 317A and that of the second LED 317B form a major angle, and the angle is larger than the angle between each of them and the light-emitting surface 317a of the third LED 317C. The first LED 317A of the three LEDs 317 has the light-emitting surface 317a facing a segment line SL between the fan-shaped areas SA adjacent to each other in the clockwise direction (side opposite the second LED 317B and the third LED 317C in the circumferential direction), and the first LED 317A has an optical axis intersecting the segment line SL. In contrast, the second LED 317B has the light-emitting surface 317a facing a segment line SL between the fan-shaped areas SA adjacent to each other in the counterclockwise direction (side opposite the first LED 317A and the third LED 317C in the circumferential direction), and the second LED 317B has an optical axis intersecting the segment line SL. This configuration allows a larger amount of the light that has been applied to the light entrance surface 314a from the light-emitting surfaces 317a of the LEDs 317, which constitute the LED group 317G provided for the fan-shaped area SA, to travel toward a portion between the LED groups 317G in the adjacent fan-shaped areas SA, and thus the portion is unlikely to have a dark portion. In other words, the output angle range of the light emitted by the LED group 317G is wider than that in the above-described third embodiment, and thus the light that has entered, the light guide plate 314 travels in the fan-shaped area SA while spreading wider in the circumferential direction, reliably reducing the uneven brightness. In FIG. 14, the output angle range of the light from the LED 317 is indicated by one-dot chain lines.

As illustrated in FIG. 14, the cutout 314e in the outer peripheral portion of the light guide plate 314 has a substantially trapezoidal shape in plan view, and the cutout depth is the deepest at the central position. The formation range of the cutout 314e is narrower in the circumferential direction than that in the above-described third embodiment, but wider (deeper) in the radial direction. A portion of each of the three LEDs 317 constituting the LED group 317G is positioned in the cutout 314e, and the portion is in the cutout 314e over a larger area than that in the above-described third embodiment. This further reduces the frame size compared with the above-described third embodiment. The cutout 314e provides three light entrance surfaces 314a connected to each other at an angle in the outer peripheral surface of the light guide plate 314. The three light entrance surfaces 314a have a symmetrical shape. The three light entrance surfaces 314a include one (a first light entrance surface 314aA) parallel to the light emitting surface 317a of the first LED 317A, one (a second light entrance surface 314aB) parallel to the light emitting surface 317a of the second LED 317B, and one (a third light entrance surface 314aC) parallel to the light emitting surface 317a of the third LED 317C. The angle between each of the first light entrance surface 314aA and the second light entrance surface 314aB and the third light entrance surface 314aC is smaller than 180 degrees, i.e., a minor angle. The sum of such am angle and the angle between the light-emitting surface 317a of the first LED 317A or the second LED 317B, which constitute the LED group 317G, and the light-emitting surface 317a of the third LED 317C is 360 degrees, i.e., a full angle. Furthermore, the angle between the first light entrance surface 314aA and the second light entrance surface 314aB is a minor angle, and the sum of such an angle and the angle between the light-emitting surfaces 317a of the first LED 317A and the second LED 317B, which constitute the LED group 317G, is 360 degrees, i.e., a full angle. The first light entrance surface 314aA parallel to the light-emitting surface 317a of the first LED 317A would come in contact with the light-emitting surface 317a of the first LED 317A if the light guide plate 314 turns in the clockwise direction. The second light entrance surface 314aB parallel to the light-emitting surface 317a of the second LED 317B would come in contact with the light-emitting surface 317a of the second LED 317B if the light guide plate 314 turns in the counterclockwise direction. The third light entrance surface 314aC is parallel to the light-emitting surface 317a of the third LED 317C and would come in contact with the light-emitting surface 317a of the third LED 317C if the light guide plate 314 turns in the counterclockwise direction. This limits the amount of displacement of the substantially circular light guide plate 314 in the circumferential direction.

Fifth Embodiment

A fifth embodiment of the invention is described with reference to FIG. 15. In the fifth embodiment, the configuration of a light guide plate 414 differs from that in the above-described second embodiment. The configurations, operations, and effects similar to those in the second embodiment are not described.

Figure 15:
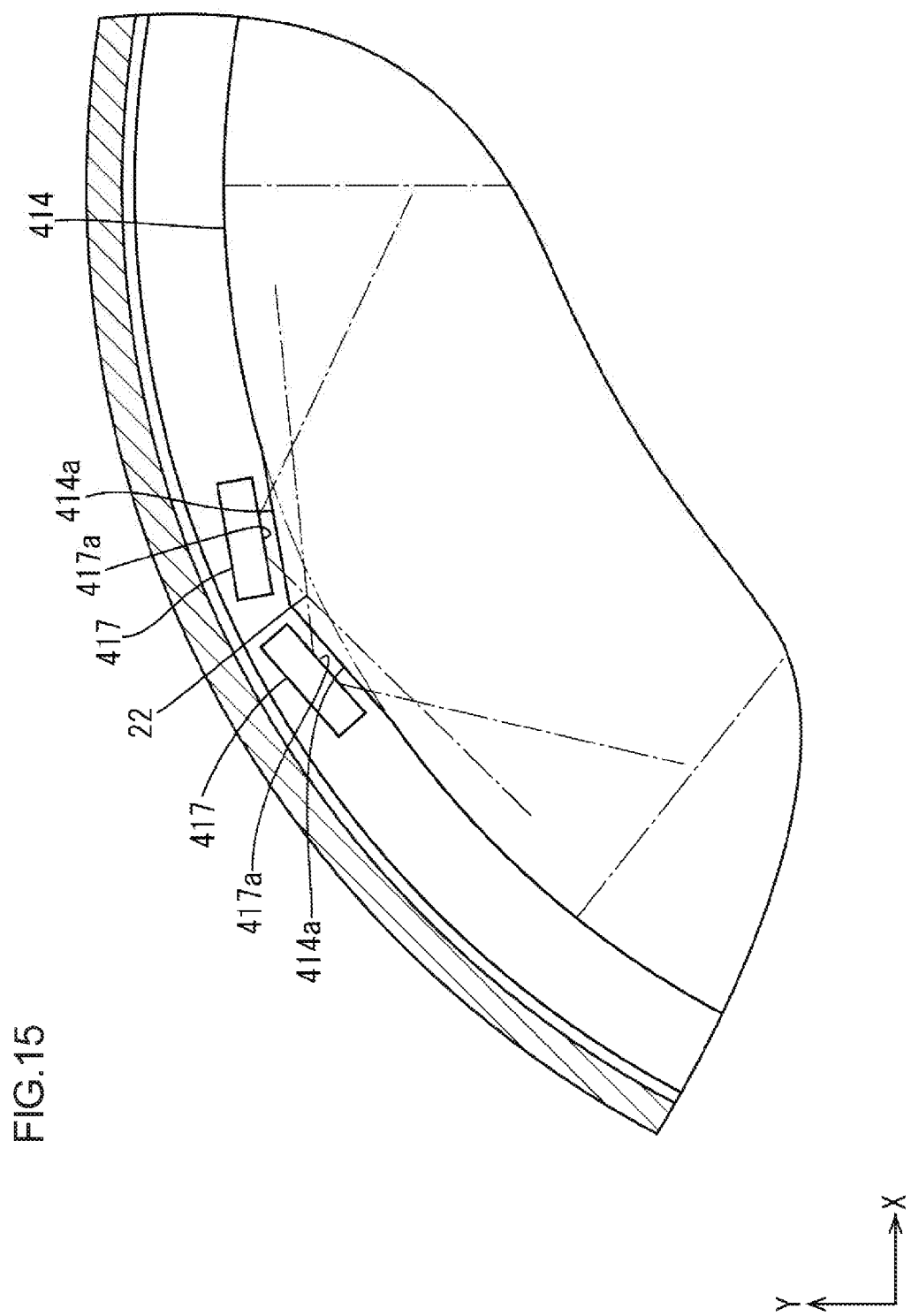
FIG. 15 is a magnified plan view of a backlight device according to a fifth embodiment of the invention.

As illustrated in FIG. 15, the light guide plate 414 according to this embodiment includes protrusions 22 protruding outwardly in a radial direction from the outer peripheral portion at positions away from each other in the circumferential direction. The protrusion 22 has a substantially triangle shape in plan view and has two straight outer surfaces connected to each other at an angle. The outer surfaces of the protrusion 22 provide a portion of the outer peripheral surface of the light guide plate 414 and provide two light entrance surfaces 414a parallel to light-emitting surfaces 417a of LEDs 417. The two light entrance surfaces 414a of the protrusion 22 form an angle larger than 180 degrees, i.e., a major angle, and the angle is substantially equal to the angle between the light-emitting surfaces 417a of the two LEDs 417. This configuration also provides the operations and the effects similar to those in the above-described second embodiment.

Sixth Embodiment

A sixth embodiment of the invention is described with reference to FIG. 16. In the sixth embodiment, the configuration of a light guide plate 514 differs from that in the above-described fourth embodiment. The configurations, operations, and effects similar to those in the fourth embodiment are not described.

Figure 16:
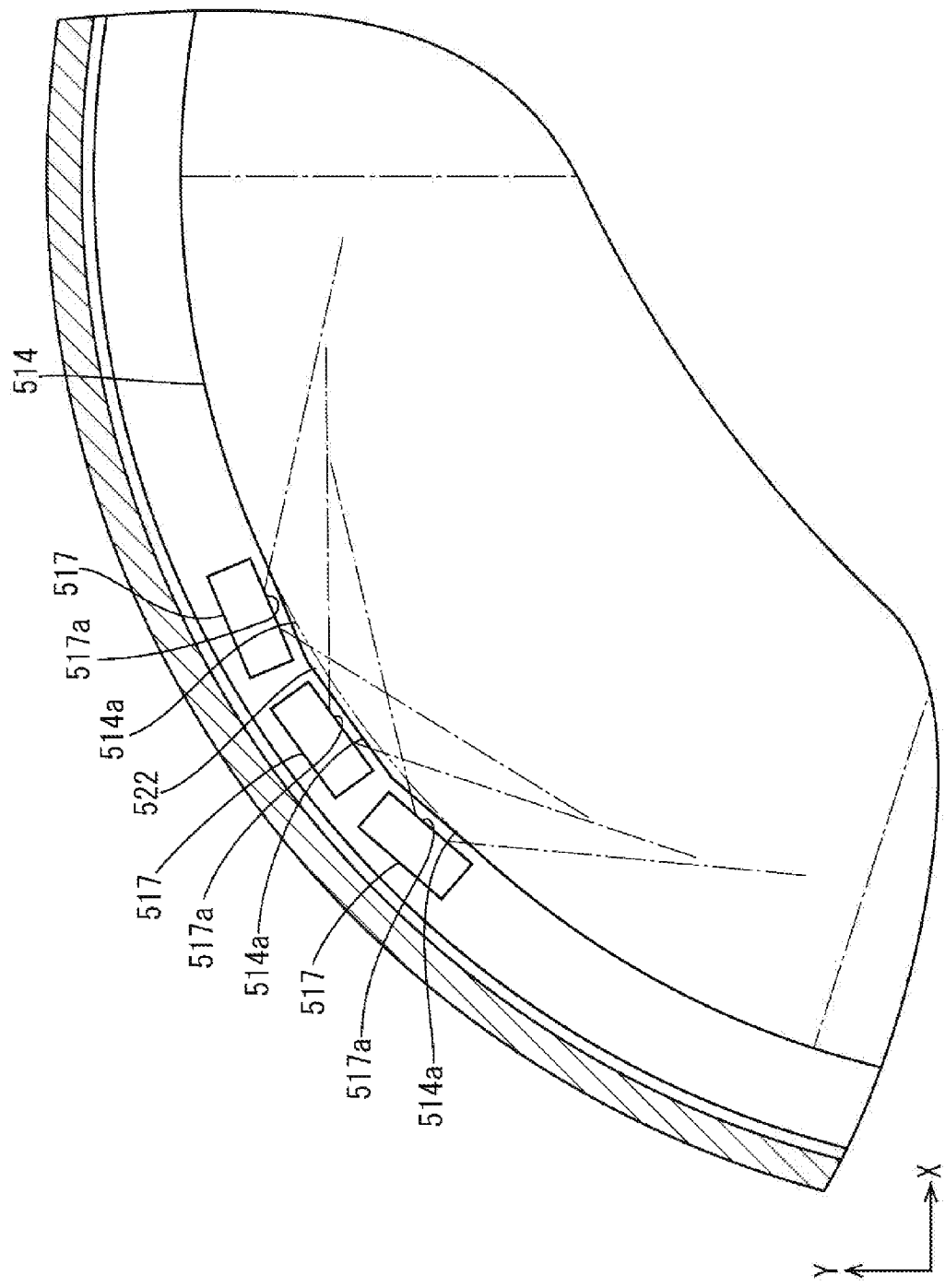
FIG. 16 is a magnified plan view of a backlight device according to a sixth embodiment of the invention.

As illustrated in FIG. 16, the light guide plate 514 according to this embodiment includes protrusions 522 protruding outwardly in the radial direction from the outer peripheral portion at positions away from each other in the circumferential direction. The protrusion 522 has a substantially trapezoidal shape in plan view and has three straight outer surfaces connected to each other at an angle. The outer surfaces of the protrusion 522 provide a portion of the outer peripheral surface of the light guide plate 514 and provide three light entrance surfaces 514a parallel to light-emitting surfaces 517a of LEDs 517. The angles between adjacent two light entrance surfaces among the three light entrance surfaces 514a of the protrusion 522 are larger than 180 degrees, i.e., a major angle, and are substantially equal to the angles between the adjacent two light-emitting surfaces 517a among the three LEDs 517. This configuration also provides the operations and the effects similar to those in the above-described fourth embodiment.

Seventh Embodiment

A seventh embodiment of the invention is described with reference to FIG. 17. In the seventh embodiment, the plate surface of a backlight device 612 and a light guide plate 614 differ from those in the above-described first embodiment. The configurations, operations, and effects similar to those in the first embodiment are not described.

Figure 17:
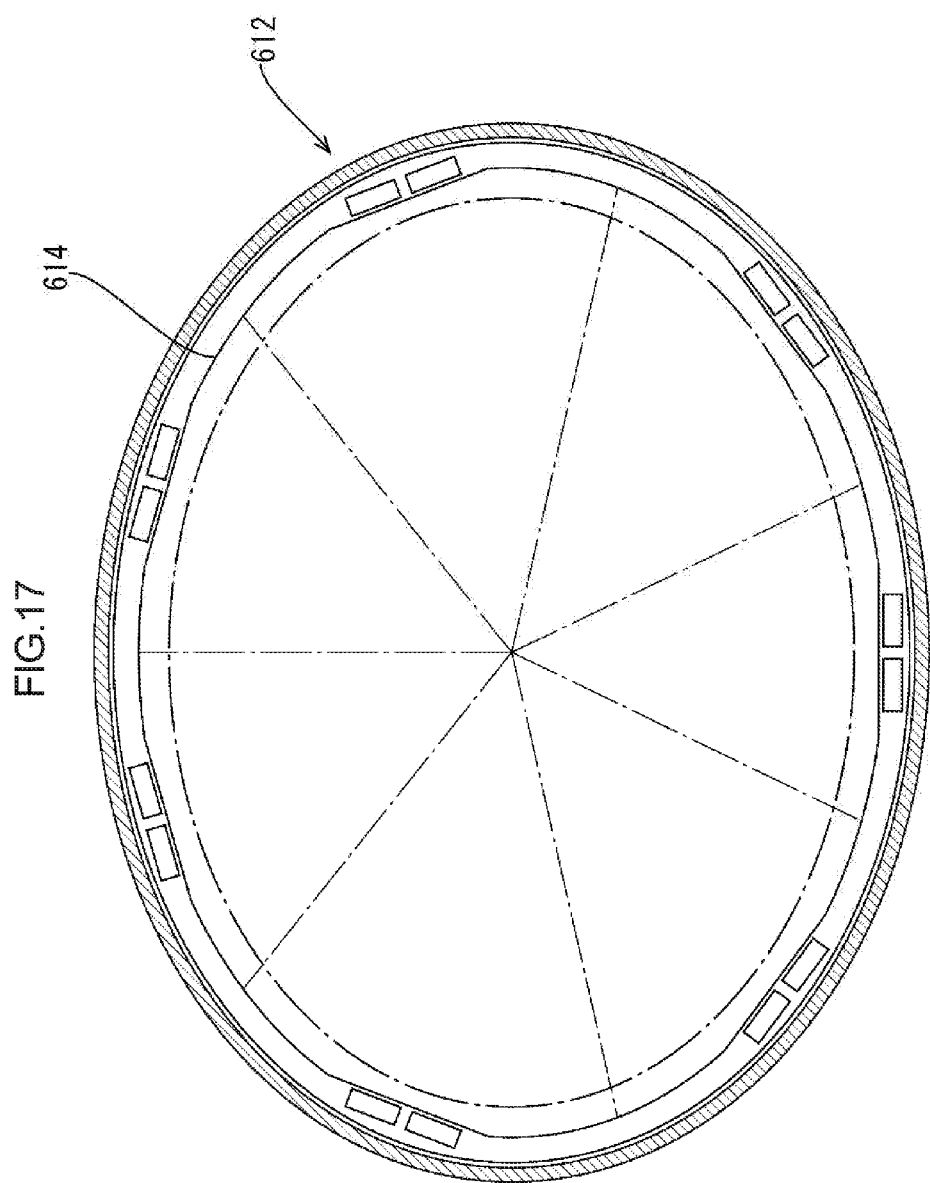
FIG. 17 is a magnified plan view of a backlight device according to a seventh embodiment of the invention.

As illustrated in FIG. 17, the backlight device 612 and the light guide plate 614 according to this embodiment has a substantially horizontally elongated elliptical shape in plan view. This configuration also provides the operations and the effects similar to those in the above-described first embodiment.

Other Embodiments

The present invention is not limited to the embodiments described above and illustrated by the drawings. For example, the following embodiments will be included in the technical scope of the present invention.

(1) In the above-described embodiments, the LED group is located at the substantially center of the fan-shaped area in the circumferential direction, but the LED group may be displaced from the center toward one end of the fan-shaped area in the circumferential direction. In such a case, the positions of the light entrance surfaces may be changed according to the change in the position of the LED group.

(2) In the above-described embodiments, the LEDs constituting the LED group are symmetrically positioned with respect to the central position of the fan-shaped area in the circumferential direction, but the LEDs constituting the LED group may be asymmetrically positioned with respect to the central position of the fan-shaped area in the circumferential direction. In such a case, the positions of the light entrance surfaces may be changed according to the change in the positions of the LEDs.

(3) In the above-described embodiments, the distance in the circumferential direction between the LEDs constituting the LED group is smaller than the width of each LED, but the distance in the circumferential direction between the LEDs constituting the LED group may be larger than the width of each LED. In such a case, the distance in the circumferential direction between the LEDs constituting the LED group is preferably smaller than the distance in the circumferential direction between the LEDs each located close in the circumferential direction to the segment line in the respective LED groups of the two LEDs adjacent to each other in the circumferential direction. However, the present invention is not limited to such a configuration.

(4) In the above-described embodiments, for example, the distance in the circumferential direction between the LEDs constituting the LED group is smaller than the distance between the LEDs each located close in the circumferential direction to the segment line in the respective LED groups of two LEDs adjacent to each other in the circumferential direction, but the above-described distances may be the same, i.e., all the LEDs may be arranged with an equal distance therebetween in the circumferential direction.

(5) In the above-described embodiments, the light-emitting surface of the LED is straight, and the light entrance surface is straight in parallel to the light-emitting surface of the LED, but the light-emitting surface of the LED may have a concave arc-like shape and the light entrance surface may have a convex arc-like shape parallel to the light-emitting surface of the LED. In such a case, a portion of the outer-peripheral surface of the light guide plate may be used as the light entrance surface as it is without formation of the cutout. The concave and convex may be reversed such that the light-emitting surface of the LED has a convex arc-like shape and the light entrance surface has a concave arc-like shape parallel to the light-emitting surface of the LED.

(6) In the above-described embodiments, for example, the light-emitting surface of the LED and the light entrance surface are arranged parallel to each other, but the light-emitting surface of the LED and the light entrance surface may be positioned at an angle. Specifically, the light-emitting surface of the LED may be straight and the arc-like shape portion of the outer peripheral surface may be used as it is as the light entrance surface without formation of the cutout in the light guide plate.

(7) In the above-described embodiments, for example, the number of fan-shaped areas in the light guide plate and the number of LED groups are five or seven, but the number may be suitably changed to an odd number of three or more such as 3, 9, 11, and 13. This enables the central angles of the fan-shaped areas to be substantially the same and enables the segment lines to meet at the center of the light guide plate.

(8) Other than the above-described (7), the number of fan-shaped areas in the light guide plate and the number of LED groups may be an even number of two or more. In such a case, an even number of two or more of the fan-shaped areas is made to have a different central angle. This enables the segment lines to meet at the center of the light guide plate.

(9) In the above-described embodiments, for example, the same numbers (two or three) of LEDs constitute the LED groups provided for the fan-shaped areas, but the numbers of LEDs constituting each of the LED groups provided for the fan-shaped areas may differ from each other.

(10) In the above-described embodiments, for example, the number of LEDs constituting each of the LED groups provided for the fan-shaped areas is two or three, but the number of LEDs constituting each of the LED groups may be four or more.

(11) In the above-described embodiments, for example, the number of LEDs constituting each of the LED groups provided for the fan-shaped areas and the number of wiring portions are the same, but the number of wiring portions may be larger than the number of LEDs constituting each of the LED groups provided for the fan-shaped areas.

(12) In the above-described embodiments, the LEDs connected to the same wiring portion form the same central angle in the fan-shaped areas, but the LEDs connected to the same wiring portion may form different central angles in the fan-shaped areas.

(13) In the above-described embodiments, for example, the number of anode-side power supply terminals is the same as that of cathode-side power supply terminals, but only one common anode-side power supply terminal may be provided.

(14) In the above-described embodiments, for example, the wiring portions are collectively connected at one end to the extend wiring portion continuously extending to the anode-side power supply terminals, but the extended wiring portion may be provided for each anode-side power supply terminal and the wiring portions may be separately connected at one end to the extended wiring portions.

(15) In the above-described second and fourth embodiments, the angle between the light-emitting surfaces of the LEDs and the angle between the light entrance surfaces are substantially the same, but the angles may be different from each other.

(16) Other than the above-described second and fourth embodiments, the specific angle between the light-emitting surfaces of the LEDs and the specific angle between the light entrance surfaces may be suitably changed.

(17) In the above-described fifth and sixth embodiments, the light guide plate having the protrusions having the light entrance surfaces is described as a modification of the second and fourth embodiments. Other than this, as a modification of the first, third, or seventh embodiment, the light guide plate may have protrusions having light entrance surfaces.

(18) In the above-described seventh embodiment, the backlight device and the light guide plate has a horizontally elongated elliptical planar shape, but the backlight device and the light guide plate may have a vertically elongated elliptical planar shape.

(19) The configurations described in the second to sixth embodiments are applicable to the elliptical liquid crystal panel described in the seventh embodiment.

(20) Other than the above-described embodiments, the specific value of the thickness of the light guide plate included in the backlight device and the specific value of the height of the LED may be suitably changed.

(21) In the above-described embodiments, a material of the semiconductor film constituting the TFT is an oxide semiconductor material. A specific example thereof preferably includes In—Ga—Zn—O semiconductor (Indium Gallium Zinc Oxide) including indium (In), gallium (Ga), Zinc (Zn), and Oxygen (O), for example. Here, the In—Ga—Zn—O semiconductor is a ternary oxide of In (Indium), Ga (Gallium), and Zn (Zinc). The proportion (composition ratio) of In, Ga, and Zn is not particularly limited. For example, the proportion may be In:Ga:Zn=2:2:1, In:Ga:Zn=1:1:1, or In:Ga:Zn=1:1:2, for example. The In—Ga—Zn—O semiconductor including In, Ga, and Zn in the proportion of 1:1:1 is particularly preferable. Such an oxide semiconductor (In—Ga—Zn—O semiconductor) may be an amorphous semiconductor, but preferably is a crystalline semiconductor including a crystalline portion. A preferable example of the crystalline oxide semiconductor includes a crystalline In—Ga—Zn—O semiconductor in which the c axis is oriented substantially perpendicular to the layer surface, for example. The crystal structure of the oxide semiconductor (In—Ga—Zn—O semiconductor) is disclosed in Japanese Unexamined Patent Application Publication No. 2012-134475, for example. All the disclosure of Japanese Unexamined Patent Application Publication No. 2012-134475 is incorporated herein by reference.

(22) In the above-described embodiments, for example, the semiconductor film constituting the TFT is formed of an oxide semiconductor material, but a material of the semiconductor film may be polysilicon (one kind of polycrystallined silicon (polycrystalline silicon) such as a CG silicon (Continuous Grain Silicon)) and amorphous silicon.

(23) In the above-described embodiments, for example, the LED board is fixed to the chassis, but the LED board may be fixed to the reflective sheet.

(24) In the above-described embodiments, for example, the LED board is disposed on the rear side of the light guide plate and the reflective sheet, but the present invention is applicable to a configuration in which the LED board is disposed on the front side of the light guide plate. In such a case, the LEDs are mounted on a rear plate surface of the LED board.

(25) In the above-described embodiments, for example, the LED is a side-surface light emission type, but the LED may be a top-surface light emission type.

(26) In the above-described embodiments, for example, the LED board is composed of a film-like base member, but the base member of the LED board may have a plate shape having a constant thickness.

(27) In the above-described embodiments, the LED is used as an example of the light source, but an organic EL or the like may be used as the light source.

(28) In the above-described embodiment, the color portions of the color filter included in the liquid crystal panel include the R, G, and B color portions in three colors, but may include color portions in four or more colors.

(29) Other than the above-described embodiments, the present invention is applicable to a liquid crystal display device including a touch panel, a parallax barrier panel, or a cover glass, for example.

(30) In the above-described embodiments, the transmissive liquid crystal display device is described as an example, but the present invention is also applicable to a semi-transmissive liquid crystal display device.

(31) In the above-described embodiments, the TFT is used as a switching element of the liquid crystal display device, but the present invention is applicable to a liquid crystal display device that uses a switching element other than the TFT (for example, a thin film diode (TFD)). The present invention is also applicable to a black-and-white liquid crystal display device other than a color liquid crystal display device.

(32) In the above-described embodiments, the liquid crystal panel includes the pixel electrodes on the array substrate and the counter electrodes on the CF substrate, but a liquid crystal panel including both the pixel electrodes and the counter electrodes on the array substrate may be employed. Such a liquid crystal panel may preferably be an IPS (In-Plane Switching) mode liquid crystal panel or an FFS (Fringe Field Switching) mode liquid crystal panel.

(33) In the above-described embodiments, the liquid crystal panel is used as the display panel, but a MEMS (Micro Electro Mechanical Systems) display panel, which is configured to display an image by using light from the backlight device, may be used, for example. In the MEMS display panel, micro mechanical shutters constituting display pixels are arranged in a matrix in a plane. The mechanical shutters are independently opened or closed such that the transmission amount of light from the backlight device is adjusted for each of the display pixels. This enables an image in a predetermined tone to be displayed. When such a MEMS display panel is used, the backlight device preferably employs LEDs each configured to emit light in a single color of red, green, or blue. The opening-closing timing of each mechanical shutter of the MEMS display panel is controlled in synchronization with the time-divisional emission of light in each color from the LEDs, enabling a color image to be displayed. A specific example of the LED preferably includes, but not limited to, a 3-in-1 type LED including a red LED chip, a green LED chip, and a blue LED chip and allowing the LED chips in those colors to be time-divisionally activated.

EXPLANATION OF SYMBOLS 10 liquid crystal display device (display device)
11 liquid crystal panel (display panel)
12, 112, 212, 612 backlight device (lighting device)
14, 114, 214, 314, 414, 514, 614 light guide plate
14a, 114a, 214a, 314a, 414a, 514a light entrance surface
14e, 114e, 214e, 314e cutout
17, 117, 217, 317, 417, 517 LED (light source)
17a, 117a, 317a, 417a, 517a light-emitting surface
18, 218 LED board (light source board)
18c, 218c wiring portion (power supply portion, power supply wiring portion)
AA effective light output area
C center
NAA ineffective light output area
SA fan-shaped area
SL segment line

The invention claimed is:

1. A lighting device comprising:
a light guide plate having a substantially circular or elliptical outer shape and having a plurality of fan-shaped areas defined by segment lines extending through a center thereof, all the segment lines meeting at the center;
a plurality of light sources arranged next to each other in a circumferential direction of the light guide plate to surround the light guide plate, the plurality of light sources including sets of multiple light sources, each of the sets of multiple light sources being provided for each of the plurality of fan-shaped areas, the sets of multiple light sources included in the plurality of fan-shaped areas that area adjacent to each other being arranged such that a middle position between light sources each located at an end in the circumferential direction in each of the respective sets of the multiple light sources adjacent to each other is on one of the segment lines; and
a plurality of power supply portions a number of which is equal to or larger than a number of the multiple light sources included in each of the sets of multiple light sources provided for the plurality of fan-shaped areas, the plurality of power supply portions being configured to supply electric power to the respective multiple light sources provided for each of the plurality of fan-shaped areas.

2. The lighting device according to claim 1, wherein the plurality of fan-shaped areas of the light guide plate have a same central angle, and a number of the fan-shaped areas is an odd number of three or more.

3. The lighting device according to claim 2, wherein a same number of light sources are included in each of the sets of multiple light sources provided for the plurality of fan-shaped areas.

4. The lighting device according to claim 3, wherein the plurality of light sources are arranged such that light sources connected to same one of the plurality of power supply portions in the plurality of fan-shaped areas form the same central angle.

5. The lighting device according to claim 1, wherein the plurality of light sources are arranged such that a distance between the multiple light sources in each of the sets of multiple light sources provided for the plurality of fan-shaped areas is smaller than a distance between the light sources each located at an end in the circumferential direction in each of the respective sets of the multiple light sources provided for the plurality of fan-shaped areas adjacent to each other in the circumferential direction.

6. The lighting device according to claim 5, wherein the plurality of light sources are arranged such that a central position between the light sources located at ends in the circumferential direction in each of the sets of the multiple light sources provided for the plurality of fan-shaped areas coincides with a central position of each of the plurality of fan-shaped areas in the circumferential direction.

7. The lighting device according to claim 1, wherein the light guide plate has a plurality of light entrance surfaces for each of the plurality of fan-shaped areas in an outer peripheral surface thereof, and the plurality of light entrance surfaces area parallel to light-emitting surfaces of the plurality of light sources such that light from the plurality of light sources enters through the plurality of light entrance surfaces.

8. The lighting device according to claim 7, wherein
the light guide plate has cutouts having the plurality of light entrance surfaces, the cutouts are obtained by cutting out an outer peripheral portion of the light guide plate in the circumferential direction, and
the plurality of light sources are arranged such that a part of each of the plurality of light sources is in one of the cutouts.

9. The lighting device according to claim 8, wherein at least a part of each of the plurality of light sources included in one of the plurality of fan-shaped areas is collectively in each of the cutouts, and each of the cutouts has the light entrance surfaces, and the number of the cutouts is equal to the number of the plurality of fan-shaped areas.

10. The lighting device according to claim 8, wherein the light guide plate includes a central portion that is an effective light output area through which the light effectively exits and the outer peripheral portion that is an ineffective light output area surrounding the effective light output area and having the cutouts.

11. The lighting device according to claim 1, wherein the plurality of light sources area arranged such that the sets of the multiple light sources provided for the plurality of fan-shaped areas each include one light source having a light-emitting surface tilted with respect to another light source.

12. The lighting device according to claim 11, wherein
the plurality of light sources area arranged such that the multiple light sources provided for each of the plurality of fan-shaped areas include one light source on one side in the circumferential direction having the light-emitting surface facing one side in the circumferential direction and another light source on another side in the circumferential direction having a light-emitting surface facing another side in the circumferential direction, and
the light guide plate has cutouts each obtained by cutting out a part of an outer peripheral portion of the light guide plate in the circumferential direction, each of the cutouts has a plurality portion of the light guide plate in the circumferential direction, each of the cutouts has a plurality of light entrance surfaces parallel to the light-emitting surfaces of the multiple light sources provided for each of the plurality of fan-shaped areas, light from the plurality of light sources enters through the plurality of light entrance surfaces, at least a portion of each of the multiple light sources provided for the plurality of fan-shaped areas is collectively positioned in each of the cutouts, and the number of the cutouts is equal to the number of the plurality of fan-shaped areas.

13. The lighting device according to claim 1, further comprising a light source board on which the plurality of light sources area mounted, the light source board including a plurality of power supply wiring portions constituting the plurality of power supply portions, the plurality of power supply wiring portions being connected to the respective light sources in each of the sets of the multiple light sources provided for the plurality of fan-shaped areas.

14. A display device comprising:
the lighting device according to claim 1; and
a display panel configured to provide a display by using light from the lighting device.

* * * * *